United States Patent
Zhou

(10) Patent No.: US 11,368,234 B2
(45) Date of Patent: Jun. 21, 2022

(54) METHOD FOR DETERMINING CQI INFORMATION, BASE STATION, AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 112 days.

(21) Appl. No.: 16/804,747

(22) Filed: Feb. 28, 2020

(65) Prior Publication Data

US 2020/0204277 A1 Jun. 25, 2020

Related U.S. Application Data

(63) Continuation of application No. PCT/CN2017/100207, filed on Sep. 1, 2017.

(51) Int. Cl.
*H04W 24/08* (2009.01)
*H04B 17/345* (2015.01)
*H04W 72/12* (2009.01)

(52) U.S. Cl.
CPC .......... *H04B 17/345* (2015.01); *H04W 24/08* (2013.01); *H04W 72/1231* (2013.01)

(58) Field of Classification Search
None
See application file for complete search history.

(56) References Cited

U.S. PATENT DOCUMENTS

| 2008/0214198 A1 | 9/2008 | Chen |
| 2012/0071103 A1 | 3/2012 | Kadous |
| 2012/0163208 A1 | 6/2012 | Kamble |

(Continued)

FOREIGN PATENT DOCUMENTS

| CN | 102148666 A | 8/2011 |
| CN | 102378299 A | 3/2012 |

(Continued)

OTHER PUBLICATIONS

3GPP TSG-RAN WG1 #90 R1-1714294, Prague, Czechia, Aug. 21-25, 2017, Source: Ericsson; Title: Discussion on CQI and MCS; Agenda Item: 6.1.2.2.8.

(Continued)

*Primary Examiner* — Anh Vu H Ly
(74) *Attorney, Agent, or Firm* — Syncoda LLC; Feng Ma

(57) ABSTRACT

A method for determining channel quality indication (CQI) information, which is implemented by a base station and includes that: determining CQI feedback configuration information of a target user equipment (UE), where the CQI feedback configuration information at least includes CQI feedback configuration information of an interference sub-band and the interference sub-band is a downlink (DL) frequency range involved in intra-device interference; sending the CQI feedback configuration information to the target UE; and determining target CQI information for subsequent DL scheduling based on CQI information, reported by the target UE based on the CQI feedback configuration information, of different bandwidth granularities.

17 Claims, 27 Drawing Sheets

---

Target CQI information for subsequent DL scheduling in an interference sub-band is determined based on CQI information, determined by target UE, of the interference sub-band — 131

Target CQI information for subsequent DL scheduling in an interference-free sub-band is determined baesd on CQI information, determined by the target UE, of another one or more bandwidth granularities — 132

(56) References Cited

U.S. PATENT DOCUMENTS

| | | | | |
|---|---|---|---|---|
| 2012/0164948 A1* | 6/2012 | Narasimha | ........ | H04W 72/1215 455/63.1 |
| 2013/0044621 A1* | 2/2013 | Jung | ..................... | H04L 5/0007 370/252 |
| 2013/0176877 A1 | 7/2013 | Sadek et al. | | |
| 2013/0208587 A1 | 8/2013 | Bala et al. | | |
| 2013/0303214 A1 | 11/2013 | Ahmadi | | |
| 2015/0043363 A1* | 2/2015 | Koskinen | .............. | H04W 16/14 370/252 |
| 2015/0327095 A1 | 11/2015 | Kwak et al. | | |
| 2016/0309494 A1 | 10/2016 | Kadous et al. | | |
| 2018/0048347 A1* | 2/2018 | Kim | .......................... | H04L 5/14 |
| 2018/0359069 A1* | 12/2018 | Nam | ..................... | H04L 5/0048 |
| 2020/0195375 A1* | 6/2020 | Zhou | ..................... | H04L 5/0057 |

FOREIGN PATENT DOCUMENTS

| | | |
|---|---|---|
| CN | 103120012 A | 5/2013 |
| CN | 103326815 A | 9/2013 |
| CN | 103716828 A | 4/2014 |
| CN | 103905102 A | 7/2014 |
| CN | 104115517 A | 10/2014 |
| CN | 104247488 A | 12/2014 |
| CN | 106464406 A | 2/2017 |
| WO | 2008098223 A2 | 8/2008 |

OTHER PUBLICATIONS

First Office Action of the Chinese application No. 201780001381.7, dated Feb. 10, 2021.

Fujitsu. Scheduling and CQI feedback for URLLC. 3GPP TSG RAN WG1 Meeting #86bis R1-1608815. Oct. 14, 2016 (Oct. 14, 2016), section 2.

LG Electronics: "Frequency granularity of CQI and PMI feedback", 3GPP Draft; R1-073491, 3rd Generation Partnership Project (3GPP), Mobile Competence Centre; 650, Route Des Lucioles; F-06921 Sophia-Antipolis Cedex; France, vol. RAN WG1, No. Athens, Greece; Aug. 15, 2007, Aug. 15, 2007 (Aug. 15, 2007), XP050107098, [ retrieved on Aug. 15, 2007 ] the whole document.

International Search Report in the international application No. PCT/CN2017/100207, dated May 31, 2018.

English translation of the Written Opinion of the International Search Authority in the international application No. PCT/CN2017/100207, dated May 31, 2018.

Supplementary European Search Report in the European application No. 17923886.0, dated Jul. 21, 2020.

\* cited by examiner

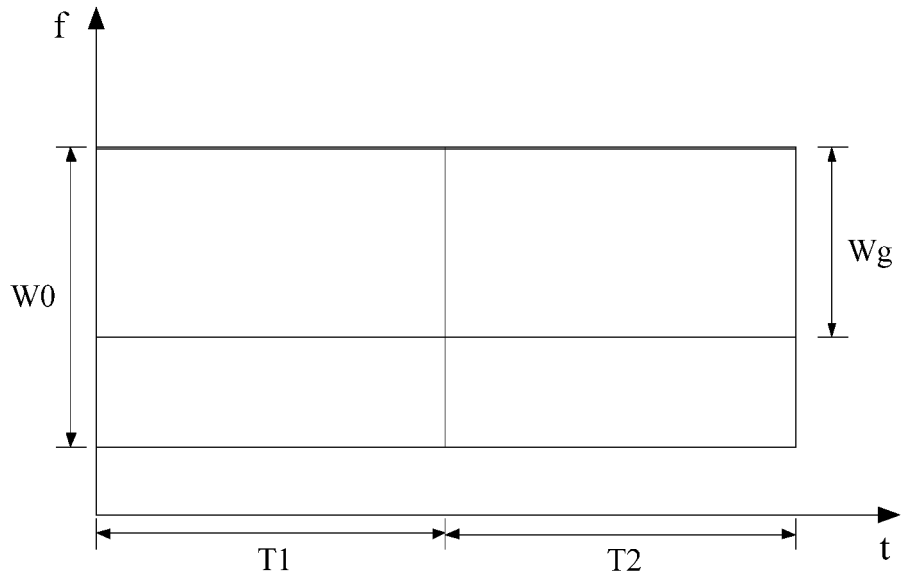

FIG. 6D

```
┌─────────────────────────────────────────┐
│ Before subsequent DL scheduling is      │
│ executed, CQI modification indication   │─ 1312-1
│ information is sent to target UE to     │
│ instruct the target UE to modify        │
│ determined original CQI information     │
│ by use of a preset offset               │
└─────────────────────────────────────────┘
                    │
                    ▼
┌─────────────────────────────────────────┐
│ Modified CQI information reported by    │─ 1312-2
│ the target UE is received               │
└─────────────────────────────────────────┘
```

FIG. 7

```
┌─────────────────────────────────────────┐
│ Original CQI information acquired by    │─ 1312-3
│ target UE in a CQI measurement period   │
│ of an interference sub-band is received │
└─────────────────────────────────────────┘
                    │
                    ▼
┌─────────────────────────────────────────┐
│ The original CQI information is         │─ 1312-4
│ modified by use of a preset offset to   │
│ obtain modified CQI information         │
└─────────────────────────────────────────┘
```

FIG. 8

METHOD FOR DETERMINING CQI INFORMATION, BASE STATION, AND USER EQUIPMENT

CROSS-REFERENCE TO RELATED APPLICATION

This application is a continuation of International Patent Application No. PCT/CN2017/100207 filed on Sep. 1, 2017, the disclosure of which is hereby incorporated by reference in its entirety.

BACKGROUND

In the early stage of 5th-generation (5G) deployment, a non-standalone (NSA) may be adopted, namely long-term evolution (LTE) and new radio (NR) networks are simultaneously deployed. An LTE-NR interworking layout is formed by main signal coverage of a 4th-generation (4G)-network-based LTE system and strong complement of a 5G-network-based NR system to data transmission services.

SUMMARY

This disclosure relates generally to the technical field of communications, and more specifically to a method for determining channel quality indication (CQI) information, a base station and a user equipment (UE).

Embodiments of the present disclosure provide a method for determining CQI information, a base station and UE, to improve accuracy of determining a modulation and coding scheme by a base station in a process of scheduling UE.

According to a first aspect of the embodiments of the present disclosure, a method for determining CQI information is provided, which may be applied to a base station and include:

CQI feedback configuration information of a target UE is determined, where the CQI feedback configuration information at least including CQI feedback configuration information of an interference sub-band, and the interference sub-band is a DL frequency range involved in intra-device interference;

the CQI feedback configuration information is sent to the target UE; and target CQI information for subsequent DL scheduling is determined based on CQI information, reported by the target UE based on the CQI feedback configuration information, of different bandwidth granularities.

According to a second aspect of the embodiments of the present disclosure, a method for determining CQI information is provided, which may be applied to UE and include that:

CQI feedback configuration information sent by a base station is received, where the CQI feedback configuration information at least includes CQI feedback configuration information of an interference sub-band, and the interference sub-band is a DL working frequency range involved in intra-device interference; and CQI information of different bandwidth granularities is reported to the base station based on the CQI feedback configuration information.

According to a third aspect of the embodiments of the present disclosure, a base station is provided, which may include:

a transceiver;
a processor; and
a memory configured to store instructions executable for the processor, the processor is configured to:

determine CQI feedback configuration information of a target UE, where the CQI feedback configuration information at least includes CQI feedback configuration information of an interference sub-band, and the interference sub-band is a DL frequency range involved in intra-device interference;

send, through the transceiver, the CQI feedback configuration information to the target UE; and determine target CQI information for subsequent DL scheduling based on CQI information, reported by the target UE based on the CQI feedback configuration information, of different bandwidth granularities.

In some embodiments, the processor may be further configured to:

determine, based on radio frequency supporting capability information of the target UE, the interference sub-band involved in the intra-device interference and an interference-free sub-band not involved in the intra-device interference; and determine the CQI feedback configuration information of the target UE based on the interference sub-band and the interference-free sub-band.

In some embodiments, the processor may be further configured to:

determine target CQI information for subsequent DL scheduling in the interference sub-band based on CQI information, determined by the target UE, of the interference sub-band; and determine target CQI information for subsequent DL scheduling in the interference-free sub-band based on CQI information, determined by the target UE, of another one or more bandwidth granularities, the interference-free sub-band is a DL frequency range not involved in the intra-device interference, and the another one or more bandwidth granularities include a broadband, a sub-band specified by the target UE, or a sub-band configured at a higher layer.

In some embodiments, the processor may be further configured to:

determine whether intra-device interference occurrence situations of the target UE in a CQI measurement period and subsequent DL scheduling period of the interference sub-band are the same;

in response to that the intra-device interference occurrence situations are different, acquire modified CQI information; and determine, based on the modified CQI information, the target CQI information for subsequent DL scheduling in the interference sub-band.

In some embodiments, the processor may be further configured to:

before subsequent DL scheduling is executed, send, through the transceiver, CQI modification indication information to the target UE to instruct the target UE to modify determined original CQI information by use of a preset offset; and receive, through the transceiver, the modified CQI information reported by the target UE.

In some embodiments, the CQI modification indication information may further include the preset offset for modifying the original CQI information.

In some embodiments, the processor may be further configured to:

receive, through the transceiver, the original CQI information obtained by the target UE in the CQI measurement period of the interference sub-band; and modify the original CQI information by use of the preset offset to obtain the modified CQI information.

In some embodiments, the processor may be further configured to:

determine a preset offset corresponding to the target UE, where the preset offset is an intra-device interference influence value of the interference sub-band.

In some embodiments, the processor may be further configured to:

when the target UE initially accesses a network, send, through the transceiver, offset measurement indication information to the target UE, where the offset measurement indication information is to instruct the target UE to measure the CQI information in an intra-device interference occurrence period and an intra-device interference-free period in the interference sub-band respectively; and determine the preset offset corresponding to the target UE according to a CQI measurement result obtained by the target UE.

In some embodiments, the processor may be further configured to:

acquire first measured CQI information measured by the target UE in the intra-device interference occurrence period in the interference sub-band;

acquire second measured CQI information measured by the target UE in the intra-device interference-free period in the interference sub-band; and determine the preset offset corresponding to the target UE according to a difference between the first measured CQI information and the second measured CQI information;

or, acquire a CQI measurement result difference sent by the target UE, where the CQI measurement result difference is a difference between measurement results obtained by the target UE in the intra-device interference occurrence period and the intra-device interference-free period in the interference sub-band; and determine the preset offset corresponding to the target UE according to the CQI measurement result difference.

In some embodiments, the preset offset may include at least one of:

an RSRP offset, an RSRQ offset, or a CQI level offset.

According to a fourth aspect of embodiments of the present disclosure, a UE is provided, which may include:

a transceiver;

a processor; and a memory configured to store instructions executable for the processor, the processor is configured to:

receive, through the transceiver, CQI feedback configuration information from a base station, where the CQI feedback configuration information at least includes CQI feedback configuration information of an interference sub-band, and the interference sub-band is a DL working frequency range involved in intra-device interference; and report, through the transceiver, CQI information of different bandwidth granularities to the base station based on the CQI feedback configuration information.

In some embodiments, the processor may be further configured to:

report, through the transceiver, CQI information of the interference sub-band to the base station; and report, through the transceiver, CQI information of another one or more bandwidth granularities to the base station, where the another one or more bandwidth granularities include a broadband, a sub-band specified by target UE, or a sub-band configured at a higher layer.

In some embodiments, the processor may be further configured to:

before the CQI information of the interference sub-band is reported, receive, through the transceiver, CQI modification indication information from the base station;

modify, based on the CQI modification indication information, original CQI information of the interference sub-band by use of a preset offset to obtain modified CQI information; and report, through the transceiver, the modified CQI information to the base station.

In some embodiments, the CQI modification indication information may include the preset offset corresponding to the intra-device interference.

In some embodiments, the processor may be further configured to:

acquire the preset offset for modifying the original CQI information of the interference sub-band.

In some embodiments, the processor may be further configured to:

receive, through the transceiver, offset measurement indication information from the base station;

acquire, based on the offset measurement indication information, original measured CQI information in an intra-device interference occurrence period and intra-device interference-free period of the interference sub-band respectively; and obtain the preset offset based on the original measured CQI information.

In some embodiments, the processor may be further configured to:

send, through the transceiver, the original measured CQI information measured in the intra-device interference occurrence period and the intra-device interference-free period to the base station respectively such that the base station generates the preset offset based on the original measured CQI information; and receive, through the transceiver, the preset offset from the base station;

or, determine a difference between first measured CQI information and second measured CQI information to obtain a measurement result difference, where the first measured CQI information is the original CQI information measured in the intra-device interference occurrence period in the interference sub-band and the second measured CQI information is the original CQI information measured in the intra-device interference-free period in the interference sub-band;

determine the preset offset based on the measurement result difference; and send, through the transceiver, the preset offset to the base station.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

FIG. 6D is a schematic diagram illustrating another application scenario of CQI information determination according to some embodiments of the present disclosure.

FIG. 7 is a flowchart of another method for determining CQI information according to some embodiments of the present disclosure.

FIG. 8 is a flowchart of another method for determining CQI information according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

5G NR is mostly centralized in a band of 3.4 GHz to 4.2 GHz, while a great number of LTE working frequencies range from 1.7 GHz to 1.8 GHz, for example, a mainstream frequency division duplexing (FDD) band 3. For adaptation to such a network layout, two types of radio frequency transceiver units working under different network systems are required to be arranged in UE, and consequently, intra-device interference, including harmonic interference and intermodulation interference, may occur in the UE.

Figure 1A:
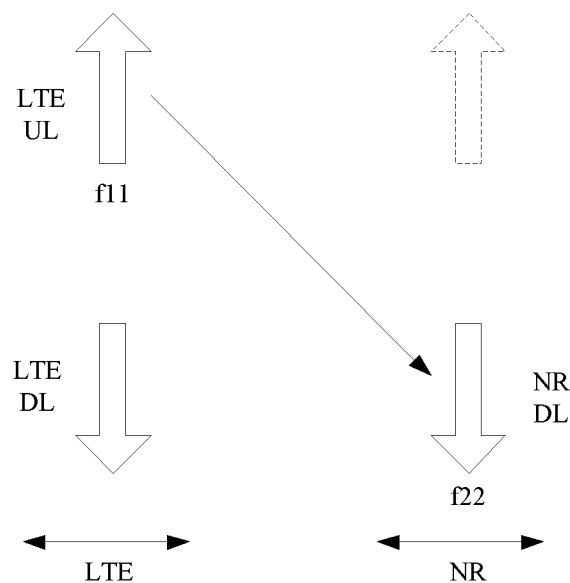
FIG. 1A is a schematic diagram illustrating harmonic interference according to some embodiments.

For example, in the abovementioned working band, when an LTE radio frequency transceiver unit and NR radio frequency transceiver unit arranged in UE simultaneously work, particularly when the LTE radio frequency transceiver unit performs uplink (UL) transmission by use of an LTE UL transmission resource and, meanwhile, the NR radio frequency transceiver unit receives downlink (DL) information by use of a DL transmission resource of an NR band, a harmonic interference phenomenon easily occurs. For example, a double-frequency signal of the band 3 is generated under the action of a nonlinear device in an LTE transmission unit, a frequency range of the double-frequency signal is (1.7 GHz~1.8 GHz)×2=3.4 GHz 3.6 GHz, right in the NR band, and interference is brought to reception of the DL information of the NR band by the UE, as illustrated in FIG. 1A.

Figure 1B:
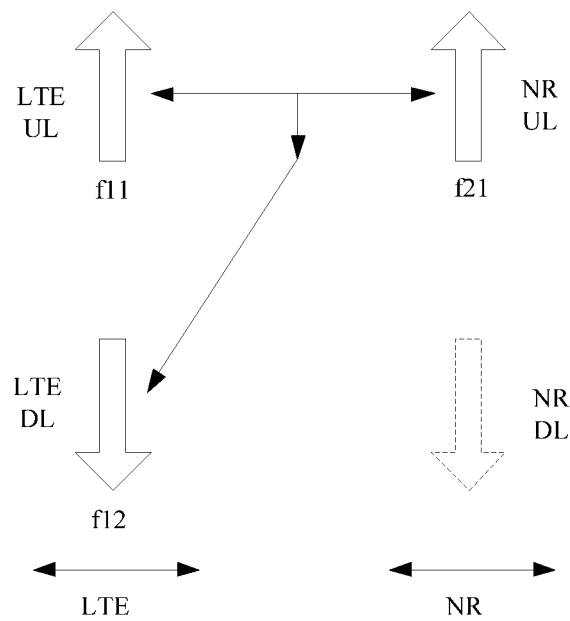
FIG. 1B is a schematic diagram illustrating intermodulation interference according to some embodiments.

In addition, when the NR radio frequency transceiver unit and/or the LTE radio frequency transceiver unit simultaneously perform UL transmission by use of UL transmission resources of at least two different frequency ranges, a combined frequency component is generated under the action of the nonlinear device in the transmission unit. If a frequency of the combined frequency component is close to a frequency of another useful signal, for example, a DL signal receiving frequency of a receiving unit, intermodulation interference may be brought to the useful signal, for example, the LTE DL information, as illustrated in FIG. 1B.

Due to an intra-device interference phenomenon occurring in a communication process, a base station may not accurately determine, based on CQI information reported by the UE, a modulation and coding scheme for subsequent scheduling of UE.

Execution bodies involved in some embodiments of the present disclosure include a base station and UE in a 5G network. The base station may be a base station, sub-base station and the like set with a massive antenna array. The UE may be a user terminal, a user node, a mobile terminal, a tablet or the like. In a specific implementation process, the base station and the UE are independent, and communicate with each other to implement the technical solutions provided in some embodiments of the present disclosure together.

In an LTE-NR interworking network distribution stage, a base station is required to determine a DL channel condition based on CQI information reported by UE and then configure a proper modulation and coding scheme for the UE according to the DL channel condition.

Intra-device interference may occur in the UE, and consequently, a DL channel state during measurement of the CQI information by the UE is different from a DL channel state during scheduling of the UE by the base station, which is directly reflected as follows: the CQI information reported to the base station by the UE may not accurately represent the DL channel state during subsequent scheduling of the UE by the base station and accuracy of the modulation and coding scheme determined by the base station for subsequent scheduling is influenced, thereby causing use of an improper data rate for DL data transmission to the target UE by the base station in an interworking band.

Figure 2:
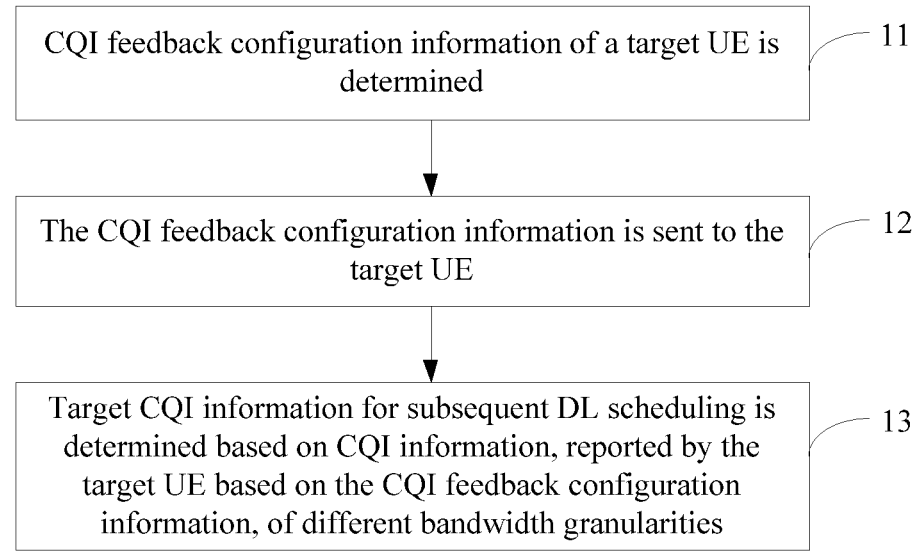
FIG. 2 is a flowchart of a method for determining CQI information according to some embodiments of the present disclosure.

Based on this, the present disclosure provides a method for determining CQI information. FIG. 2 is a flowchart of a method for determining CQI information according to some embodiments. The method is applied to a base station and includes the following operations illustrated in block 11 to block 13.

At block 11, CQI feedback configuration information of a target UE is determined, where the CQI feedback configuration information at least includes CQI feedback configuration information of an interference sub-band, and the interference sub-band is a DL frequency range involved in intra-device interference.

The CQI feedback configuration information of the interference sub-band is to instruct the target UE to feed back CQI information of the interference sub-band.

It is to be noted here that, in some embodiments of the present disclosure, when the base station schedules the target UE in the interference sub-band, the intra-device interference may occur in the target UE or the intra-device interference may also not occur and this is determined according to whether scheduling of the target UE by the base station in another band in the same period meets an intra-device interference occurrence condition or not.

Figure 3:
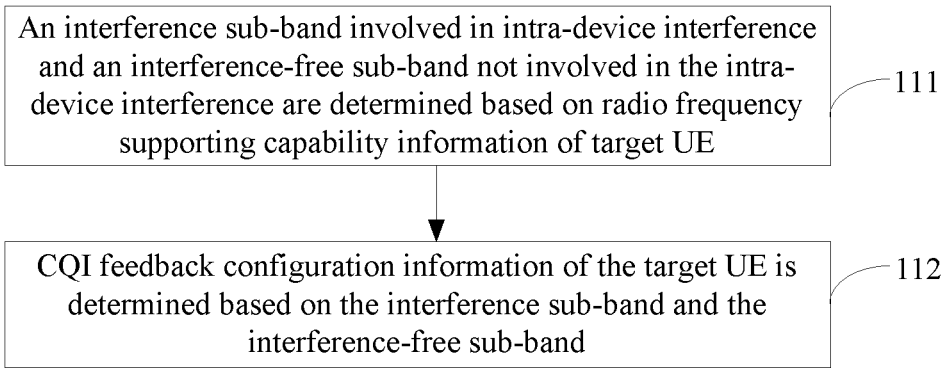
FIG. 3 is a flowchart of another method for determining CQI information according to some embodiments of the present disclosure.

FIG. 3 is a flowchart of another method for determining CQI information according to some embodiments. The operation illustrated in block 11 may include the following operations.

At block 111, the interference sub-band involved in the intra-device interference and an interference-free sub-band not involved in the intra-device interference are determined based on radio frequency supporting capability information of the target UE.

For example, the target UE is UE1. After UE1 initially accesses a network, the base station may acquire the radio frequency supporting capability information of UE1. The radio frequency supporting capability information of UE1 includes a UL working frequency range and a DL working frequency range.

The base station determines a first frequency range where interference may be generated in the DL working frequency range of UE1 according to the intra-device interference occurrence condition and determines the determined first frequency range as the interference sub-band.

Exemplarily, as illustrated in FIGS. 1A and 1B, there is made such a hypothesis that UE1 supports four working frequency ranges, which include: LTE uplink working frequency range and LTE downlink working frequency range represented as LTE UL and LTE DL respectively, and NR uplink working frequency range and NR downlink working frequency range represented as NR UL and NR DL respectively. There is made such a hypothesis that an LTE radio frequency transceiver unit adopts an FDD mode and both UL and DL working bandwidths are 20M, an NR radio frequency transceiver unit adopts a time division duplex (TDD) mode and both UL and DL working bandwidths are 60M. All working frequency ranges may be illustrated in Table 1.

TABLE 1

| Home network segment | Frequency identifier | Bandwidth range (MHz) |
|---|---|---|
| LTE UL | f11 | 1,710~1,730 |
| LTE DL | f12 | 1,920~1,940 |
| NR UL | f21 | 3,420~3,480 |
| NR DL | f22 | 3,420~3,480 |

Table 1 is looked up to obtain that, if LTE UL and NR DL simultaneously work, because a double frequency of f11 overlaps 3,420 MHz to 3,460 MHz in f22, namely (1,710~1,730)×2=3,420~3,460 MHz, harmonic interference may occur in the UE, as illustrated in FIG. 1A.

Then, the base station may determine that the first frequency range where the intra-device interference may occur in f22 is 3,420 MHz to 3,460 MHz, or called the interference sub-band, and simultaneously determine that a remaining working frequency range 3,460 MHz to 3,480 MHz in f22 is an interference-free frequency range and may be called a second frequency range or the interference-free sub-band in some embodiments of the present disclosure.

In the example, how the base station determines the interference sub-band where the intra-device interference may occur is described under the condition that the harmonic interference may occur to the target UE. The interference sub-band belongs to a 5G NR band.

Similarly, if LTE UL, NR UL and LTE DL simultaneously work, due to the action of a nonlinear device, a combined frequency generated between f11 and f21 overlaps f12, and consequently, intermodulation interference occurs in the UE, as illustrated in FIG. 1B. Under such a condition, the base station may also accurately determine the interference sub-band, for example, 1,920 MHz to 1,930 MHz, in an LTE band, i.e., a frequency range f12. Similarly, a frequency range not involved in the intra-device interference in the frequency range f12 is determined as an interference-free sub-band, for example, a frequency range of 1,930 MHz to 1,940 MHz.

It may be seen that the interference sub-band may be positioned in a 5G NR DL working band of the target UE, as illustrated in FIG. 1A, and may also be positioned in an LTE DL working band of the target UE, as illustrated in FIG. 1B.

In the embodiments of the present disclosure, a bandwidth range of the interference sub-band may be any frequency range that is accurately described and where the intra-device interference may occur. For example, it may be a bandwidth part (BWP) in a carrier and may also be accurate to a subcarrier.

At block 112, the CQI feedback configuration information of the target UE is determined based on the interference sub-band and the interference-free sub-band.

According to related knowledge, the CQI feedback configuration information may include configuration information of a reporting mode and configuration information of a reporting granularity.

The reporting mode includes periodic reporting and aperiodic reporting. Configuration information of periodic reporting includes a periodic reporting mode and a period duration. Configuration information of aperiodic reporting includes an aperiodic reporting mode and triggering time of aperiodic reporting.

In the embodiments of the present disclosure, the reporting granularity at least includes the interference sub-band. Based on this, the base station may also configure another one or more reporting granularities, and at least the following three situations may be included.

A first situation: the reporting granularity includes the interference sub-band and the interference-free sub-band.

That is, the base station instructs the target UE to simultaneously report, according to a preset CQI reporting mode, CQI information such as CQI levels determined in the interference sub-band and the interference-free sub-band.

A second situation: the reporting granularity includes the interference sub-band and a broadband.

That is, the base station instructs the target UE to report, according to a preset CQI reporting mode, a piece of CQI information for the whole system bandwidth W0 and simultaneously report a piece of CQI information for the interference sub-band.

A third situation: based on the first situation or the second situation, the reporting granularity may further include a sub-band selected by the target UE and a sub-band configured at a higher layer.

That is, based on the first situation or the second situation, the base station may further simultaneously instruct the target UE to report, according to a preset CQI reporting mode, CQI information of the sub-band selected by the UE or CQI information of the sub-band configured at a higher layer.

To sum up, a content in the CQI configuration information may be illustrated in Table 2.

TABLE 2

| | Reporting granularity | |
|---|---|---|
| Reporting mode | Required | Optional |
| Periodic | Interference sub-band, interference-free sub-band | Sub-band selected by UE |
| | Interference sub-band, broadband | Sub-band selected by UE |
| Aperiodic | Interference sub-band, interference-free sub-band | Sub-band selected by UE, sub-band configured at a higher layer |
| | Interference sub-band, broadband | Sub-band selected by UE, sub-band configured at a higher layer |

In some embodiments of the present disclosure, the base station, when configuring the target UE to feed back a CQI, instructs the target UE to feed back a CQI of the interference sub-band.

At block 12, the CQI feedback configuration information is sent to the target UE.

In some embodiments of the present disclosure, the base station may transmit the CQI feedback configuration information of the target UE to the target UE through broadcast signaling, higher layer signaling, or physical layer signaling (for example, physical downlink control channel (PDCCH) signaling). The higher layer signaling may be radio resource control (RRC) signaling and medium access control (MAC) control element (CE) signaling.

With respect to the amount of control signaling for transmission of the CQI feedback configuration information, if the CQI feedback configuration information of the target UE includes a CQI feedback granularity in the related art, namely the reporting granularity includes the broadband, the sub-band selected by the UE and the sub-band configured at the higher layer, the base station may transmit the CQI configuration information of the target UE by use of one or more pieces of control signaling.

In some embodiments, there is made such a hypothesis that the CQI feedback configuration information of the target UE includes the reporting mode (periodic feedback and period 1 ms) and the reporting granularity (the broadband and the interference sub-band).

If the base station adopts one piece of control signaling for transmission of the CQI feedback configuration information to the target UE, the control signaling may include periodic feedback, period 1 ms, a CQI of the broadband and a CQI of the interference sub-band.

That is, in the embodiments of the present disclosure, the base station may modify related control signaling, namely adding configuration information of the CQI of the interference sub-band into the related control signaling, to transmit the CQI feedback configuration information to the target UE through one piece of control signaling, so that the purpose of reducing a signaling overhead may be achieved.

In some other embodiments of the present disclosure, the base station may transmit the CQI configuration information of the target UE to the target UE through two or more pieces of control signaling. In the above example, the base station may transmit two pieces of control signaling, where the first signaling includes periodic feedback, period 1 ms and the CQI of the broadband and the second signaling includes period 1 ms and the CQI of the interference sub-band.

In some other embodiments of the present disclosure, a reporting period for the CQI of the interference sub-band may be different from a reporting period for the CQI of the broadband and, for example, may be 2 ms.

It may be seen that, in some embodiments of the present disclosure, the base station may transmit the CQI configuration information to the target UE in a manner of modifying the related signaling or adding new control signaling to enhance CQI feedback configuration flexibility.

In an embodiment of the present disclosure, the CQI feedback configuration information of the interference sub-band may further include frequency range information of the interference sub-band, to ensure that the target UE measures and feeds back the CQI information of the interference sub-band according to an accurate frequency range and ensure feedback accuracy of the CQI of the interference sub-band.

In addition, since both the base station and the UE may accurately determine specific working frequency ranges of the interference sub-band and the interference-free sub-band according to a UL and DL working frequency range supported by the UE, the CQI feedback configuration information transmitted to the target UE by the base station may also not include specific frequency range information of the interference sub-band and the interference-free sub-band, to save radio resources occupied by the CQI feedback configuration information, thereby reducing the signaling overhead.

At block 13, target CQI information for subsequent DL scheduling is determined based on CQI information, reported by the target UE based on the CQI feedback configuration information, of different bandwidth granularities.

The target UE performs CQI feedback configuration based on the received CQI feedback configuration information, acquires CQI information of the different bandwidth granularities according to bandwidth reporting granularities indicated in the CQI feedback configuration information and reports the CQI information of the different bandwidth granularities to the base station.

The CQI information reported to the base station by the target UE at least includes the CQI information of the interference sub-band.

In some embodiments of the present disclosure, the CQI information reported to the base station by the target UE may include one of the following: RSRP of a DL reference signal, RSRQ of the DL reference signal, received signal strength indicator (RSSI) of the DL reference signal, a CQI level, or the like.

The RSRP is a power of a cell common reference signal received by the UE, a value of the RSRP being a linear average of powers of resource elements (REs) in a measurement bandwidth, and reflects strength of a useful signal of a present cell.

The RSSI is a linear average of powers of all signals (including co-frequency useful signal and interference signal, adjacent-frequency interference signal, thermal noise and the like) received by the UE and reflects a load intensity on a present resource.

The RSRQ is a ratio of N times of the RSRP to the RSSI, namely RSRQ=N*RSRP/RSSI, N representing the number of REs in the measurement bandwidth of the RSRP, and it may reflect relative magnitudes of a signal and interference. RE is a minimum time-frequency resource unit in a network system. For example, a RE in an LTE system occupies a subcarrier (15 KHz) in a frequency domain and occupies an orthogonal frequency division multiplexing (OFDM) symbol (1/14 ms) in a time domain.

A signal to interference plus noise radio (SINR) is a ratio of useful signal power to a sum of interference and noise power and directly reflects quality of a received signal.

The CQI level is configured to quantitatively represent a sequence value of channel quality, and it is not only related to the SINR of the DL reference signal but also related to hardware performance such as receiving sensitivity and interference isolation capability of a reference signal receiver, i.e., the target UE. For example, in the LTE system, channel quality is quantized into sequence values 0 to 15 in a protocol according to three coding schemes supported by a physical downlink shared channel (PDSCH) of LTE, i.e., quadrature phase shift keying (QPSK), 16 quadrature amplitude modulation (16QAM) and 64QAM, and is born by 4 bits.

A CQI feedback mode specified in the protocol of the LTE system may be continued to be used in the 5G NR system. In the embodiments of the present disclosure, descriptions are made with the condition that the CQI information is the CQI level as an example.

In some embodiments of the present disclosure, a base station of a 5G NR network, when performing CQI feedback configuration for UE, may instruct the target UE to report CQI information of an interference sub-band where intra-device interference may occur to the base station for the base station to accurately determine, based on the CQI information of the interference sub-band, target CQI information for subsequent DL scheduling of the target UE to accurately determine a DL channel condition of the interference sub-band during subsequent DL scheduling based on the target CQI information and then configure a proper modulation and coding scheme for the target UE according to the channel condition, so that accuracy of the modulation and coding scheme for subsequent DL scheduling of the target UE is improved, DL information may further be transmitted to the target UE at an accurate DL transmission rate, and system performance is improved.

Figure 4:
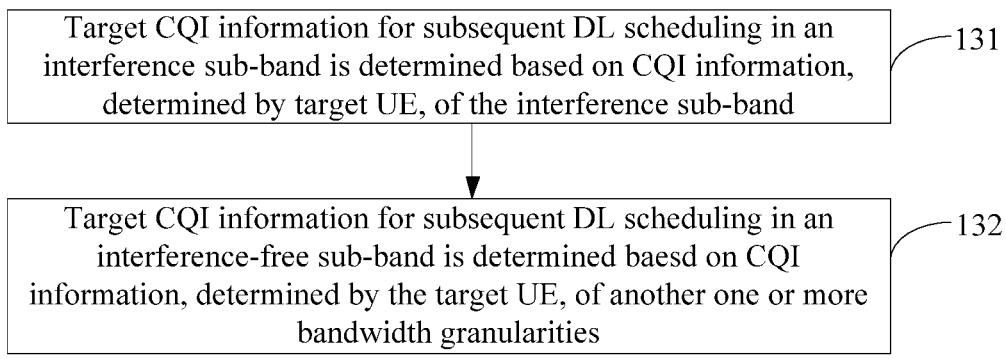
FIG. 4 is a flowchart of another method for determining CQI information according to some embodiments of the present disclosure.

FIG. 4 is a flowchart of another method for determining CQI information according to some embodiments. According to different bandwidth granularities for CQI reporting, the operation illustrated in block 13 may include the following operations.

At block 131, target CQI information for subsequent DL scheduling in the interference sub-band is determined based on CQI information, determined by the target UE, of the interference sub-band.

At block 132, target CQI information for subsequent DL scheduling in the interference-free sub-band is determined based on CQI information, determined by the target UE, of another one or more bandwidth granularities.

The interference-free sub-band is a DL frequency range not involved in the intra-device interference, and the another one or more bandwidth granularities include the broadband, the sub-band selected by the UE, or the sub-band configured at the higher layer.

It is to be noted here that there is no sequence between operation illustrated in block 131 and operation illustrated in block 132 and they may be executed at the same time.

Figure 5:
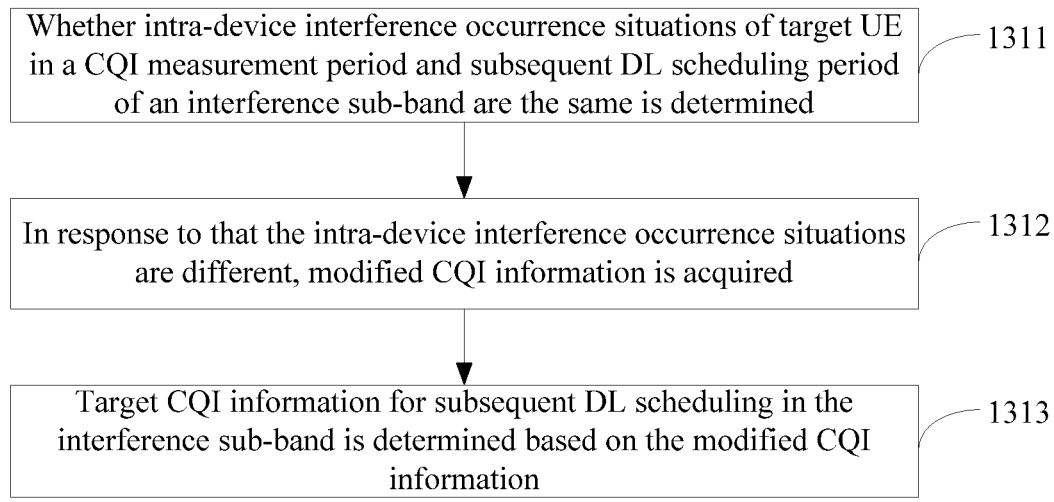
FIG. 5 is a flowchart of another method for determining CQI information according to some embodiments of the present disclosure.

With respect to the operation illustrated in block 131, FIG. 5 is a flowchart of another method for determining CQI information according to some embodiments. The operation illustrated in block 131 may include the following operations.

At block 1311, whether intra-device interference occurrence situations of the target UE in a CQI measurement period and subsequent DL scheduling period of the interference sub-band are the same is determined.

The base station may determine whether the intra-device interference may occur to the target UE in the CQI measurement period and the subsequent DL scheduling period or not according to frequency resources allocated to the target UE and information about UL and DL ratio in different time ranges.

FIG. 6A to FIG. 6D illustrate four application scenarios. Descriptions are made with Table 1 and FIG. 1A as an example. There is made such a hypothesis that the system bandwidth is W0, a frequency range where the intra-device interference may occur, i.e., the interference sub-band, is Wg, and a frequency range where the intra-device interference may not occur, i.e., the interference-free sub-band, is Wn. The target UE performs CQI measurement in a time-frequency resource range (T1, Wg) based on the CQI feedback configuration information transmitted by the base station to obtain CQI information such as a CQI level of a time period T1, and the target UE is planned to be scheduled in a time-frequency resource range (T2, Wg) with reference to the CQI level of the time period T1. T1 is the CQI measurement period of the interference sub-band Wg and, for example, is a CQI feedback period like 4 ms, and T2 is the subsequent DL scheduling period for the target UE in the interference sub-band Wg and may be a scheduling period such as 4 ms. That is, the base station determines a modulation and coding scheme for scheduling in next 4 ms by use of a CQI level fed back by the target UE in previous 4 ms.

If a channel state of the interference sub-band Wg in the time period T1 is H1 and the channel state of the interference sub-band Wg in the time period T2 is H2, the following four situations may be included.

Figure 6A:
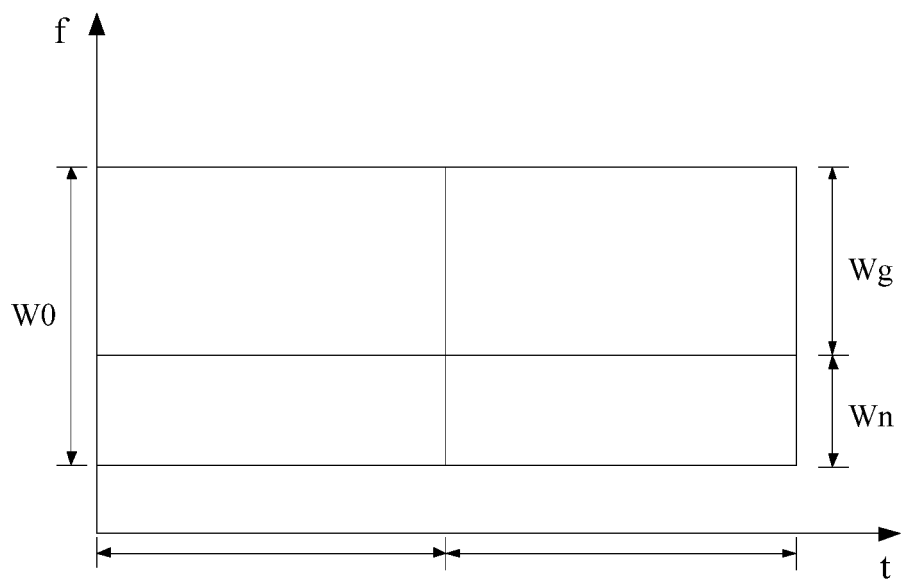
FIG. 6A is a schematic diagram illustrating an application scenario of CQI information determination according to some embodiments of the present disclosure.

A first situation: as illustrated in FIG. 6A, H1 is the same as H2 and no intra-device interference occurs to the target UE in the interference sub-band Wg.

Figure 6B:
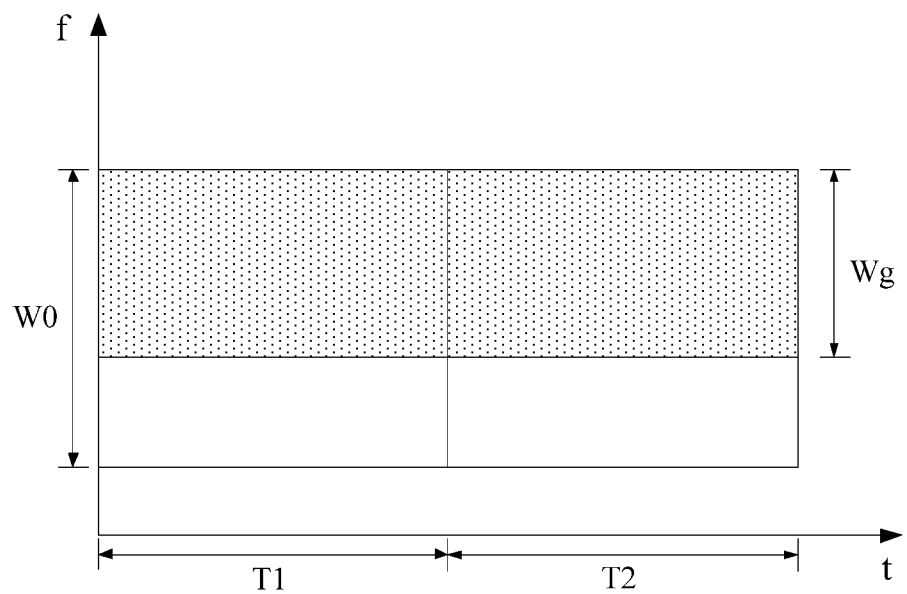
FIG. 6B is a schematic diagram illustrating another application scenario of CQI information determination according to some embodiments of the present disclosure.

A second situation: as illustrated in FIG. 6B, H1 is the same as H2 and intra-device interference occurs to the target UE in the interference sub-band Wg.

Figure 6C:
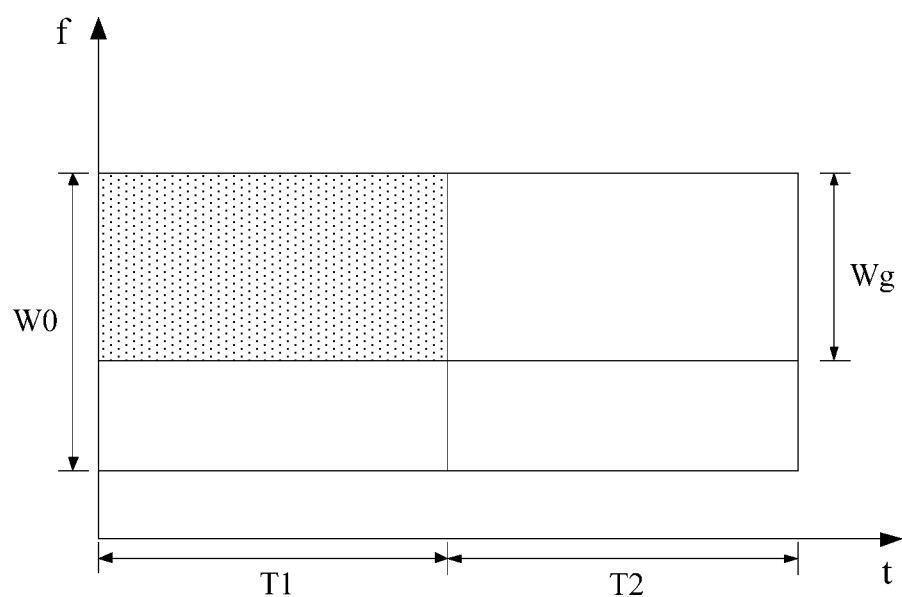
FIG. 6C is a schematic diagram illustrating another application scenario of CQI information determination according to some embodiments of the present disclosure.

A third situation: as illustrated in FIG. 6C, H1 is different from H2, intra-device interference occurs to the target UE in the CQI measurement period in the interference sub-band Wg, and no intra-device interference occurs in the subsequent DL scheduling period.

A fourth situation: as illustrated in FIG. 6D, H1 is different from H2, no intra-device interference occurs to the target UE in the CQI measurement period, and intra-device interference occurs in the subsequent DL scheduling period.

If the intra-device interference occurrence situations are the same, i.e., the first situation and the second situation, a modulation and coding scheme for DL scheduling of the target UE in the subsequent scheduling period T2 is determined according to the CQI level determined in the time period T1.

At block 1312, in response to that the intra-device interference occurrence situations are different, modified CQI information is acquired.

For the third situation and the fourth situation, it is apparently inaccurate to indicate the modulation and coding scheme for DL transmission of the target UE in the subsequent scheduling period T2 according to the CQI level determined in the time period T1.

Therefore, the base station is required to modify the CQI level in the time period T1 according to a preset strategy. For example, for the third situation, the CQI level is increased according to a preset offset. For the fourth situation, the CQI level is decreased according to a preset offset.

In the embodiments of the present disclosure, the base station may acquire the modified CQI information to accurately determine the modulation and coding scheme for subsequent DL scheduling according to the modified CQI information to improve accuracy of the modulation and coding scheme for subsequent DL scheduling.

In some embodiments of the present disclosure, the modified CQI information may be acquired in at least the following two manners.

A first acquisition manner: the target UE modifies the CQI information measured based on the DL reference signal in the time-frequency resource range (T1, Wg) and then reports the modified CQI information to the base station.

FIG. 7 is a flowchart of another method for determining CQI information according to some embodiments. The operations illustrated in block 1312 may include the following operations.

At block 1312-1, before subsequent DL scheduling is executed, CQI modification indication information is sent to the target UE to instruct the target UE to modify determined original CQI information by use of a preset offset.

In an embodiment of the present disclosure, the CQI modification indication information sent by the base station may be used to instruct the target UE to modify an original measured value of the DL reference signal in the time-frequency resource range (T1, Wg).

With respect to a transmission timing of the CQI modification indication information, it may be sent at the beginning of the time period T1 or sent in the time period T1, not later than a starting moment of the time period T2.

With respect to a content of the CQI modification indication information, if the preset offset is preset in the target UE, the CQI modification indication information may be a switching value occupying 1 bit. For example, 1 represents that modification is required, and 0 represents that modification is not required.

In some other embodiments of the present disclosure, if the preset offset is not pre-stored in the target UE, for example, the target UE accesses the network for the first time, besides modification indication information, the CQI modification indication information may further include the preset offset. That is, the base station is also required to notify the target UE of the preset offset for modifying the CQI information.

The preset offset may be a preset offset applied to all UE and may also be a preset offset related to device information of the target UE.

In some other embodiments of the present disclosure, the base station may also transmit the preset offset to the target UE by use of a piece of independent control signaling. The control signaling may be broadcast signaling, physical-layer signaling, higher-layer signaling and the like.

At block 1312-2, the modified CQI information reported by the target UE is received.

The target UE, after receiving the CQI modification indication information and determining the preset offset, may modify, based on the preset offset, the original measured value of the DL reference signal, for example, original measured values of the RSRP and the RSRQ, in the time-frequency resource range (T1, Wg), or, an original CQI level determined according to the original measured value to obtain a modified CQI value and report the modified CQI value to the base station.

In the embodiments of the present disclosure, the base station may instruct the target UE through the CQI modification indication information to perform modification from an information source, i.e., the original measured value of the reference signal, so that CQI information modification accuracy may be effectively improved to acquire more accurate modified CQI information, and subsequent DL scheduling accuracy may further be improved.

A second acquisition manner: the base station modifies the CQI information measured by the target UE in the time-frequency resource range (T1, Wg).

FIG. 8 is a flowchart of another method for determining CQI information according to some embodiments. The operations illustrated in block 1312 may include the following operations.

At block 1312-3, the original CQI information acquired by the target UE in the CQI measurement period of the interference sub-band is received.

In the embodiments of the present disclosure, for the situations illustrated in FIG. 6C and FIG. 6D, the base station may normally receive the original CQI information, for example, the original CQI level, measured by the target UE in the time-frequency resource range (T1, Wg).

At block 1312-4, the original CQI information is modified by use of the preset offset to obtain the modified CQI information.

In the scenario illustrated in FIG. 6D, since the base station may predict that the intra-device interference is about to occur to the target UE in the scheduling period T2 according to planned scheduling configuration information for the target UE in the time period T2, it is necessary to modify the presently acquired original CQI information to acquire accurate CQI information for scheduling in the time period T2.

A specific modification manner may be determined according to the original CQI information and a representation form of the preset offset. In some embodiments of the present disclosure, the preset offset may be a modification offset of the RSRP, RSRQ and CQI level generated by the intra-device interference in the interference sub-band.

In the embodiments of the present disclosure, the base station may independently complete modifying the CQI information to avoid transmission of various configuration information when instructing the UE for modification, so that the signaling overhead may be reduced, and the CQI information modification efficiency may be improved.

At block 1313, the target CQI information for subsequent DL scheduling in the interference sub-band is determined based on the modified CQI information.

In a 5G network, a reporting form for the target CQI information depends on a 5G network protocol. Exemplarily, if a modulation and coding determination manner specified in the LTE protocol is continued to be used in the 5G network, namely a \ modulation and coding scheme is determined according to a quantized CQI level sequence, the target CQI information should be a modified CQI level.

Correspondingly, if the modified CQI information determined by the base station is the modified CQI level, the modified CQI level is the target CQI information.

If the modified CQI information determined by the base station is modified RSRP and RSRQ values, the base station is further required to convert the modified CQI information into the CQI level by use of a related algorithm to obtain the target CQI information.

The base station, after obtaining the target CQI information, queries a modulation and coding scheme corresponding to the target CQI information based on the target CQI information and accurately schedules the target UE in the time-frequency resource range (T2, Wg) by use of the modulation and coding scheme.

It may be seen that, in some embodiments of the present disclosure, a base station of a 5G NR network, when performing CQI feedback configuration for UE, may instruct the target UE to report CQI information of an interference sub-band where intra-device interference may occur to the base station for the base station to accurately determine, based on CQI information of the interference sub-band, target CQI information for subsequent DL scheduling of the target UE to accurately determine a DL channel condition of the interference sub-band during subsequent DL scheduling based on the target CQI information and then configure a proper modulation and coding scheme for the target UE according to the channel condition, so that accuracy of the modulation and coding scheme for subsequent DL scheduling of the target UE is improved, DL information may further be transmitted to the target UE at an accurate DL transmission rate, and system performance is improved.

Descriptions are made in the above embodiments with the condition that the preset offset is preset in the base station as an example.

In some other embodiments of the present disclosure, considering that hardware performance of each UE may be different, intra-device interference influence values, i.e., preset offsets, determined by different UEs based on the same interference sub-band may also be different. For example, for the intra-device interference situation illustrated in FIG. 1A, if the base station determines that an intra-device interference influence value of the LTE UL frequency range of 1,710 MHz to 1,730 MHz for the NR DL frequency range of 3,460 MHz to 3,480 MHz is 50 dB, the intra-device interference influence value may be reduced to be 30 dB due to a relatively good interference shielding effect of a hardware design of UE1.

In view of influence of hardware of the UE on the intra-device interference influence value, i.e., the preset offset, when the UE initially accesses the network, the base station may further measure the preset offset corresponding to the UE and store it as capability information of the UE.

Figure 9:
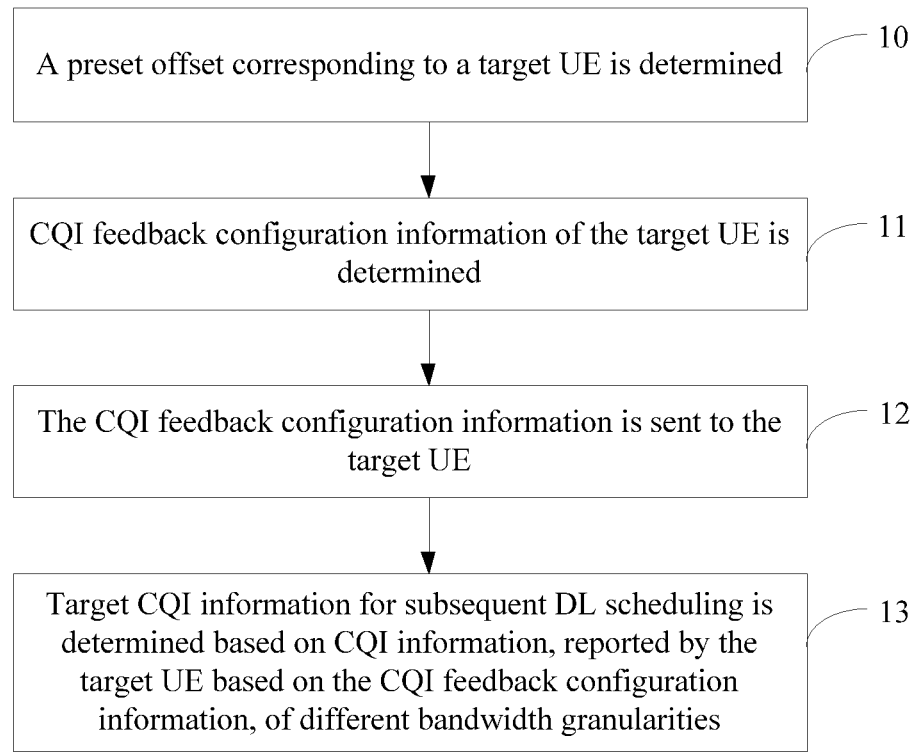
FIG. 9 is a flowchart of another method for determining CQI information according to some embodiments of the present disclosure.

FIG. 9 is a flowchart of another method for determining CQI information according to some embodiments. Based on the embodiments illustrated in FIG. 2, before the operation illustrated in block 11, the method may further include the following operation.

At block 10, the preset offset corresponding to the target UE is determined, where the preset offset is an intra-device interference influence value of the interference sub-band.

In some embodiments of the present disclosure, a determination process of the preset offset may include the following situations.

A first situation: the base station instructs the target UE to perform CQI measurement on the same interference sub-band for the situations that the intra-device interference occurs and no intra-device interference occurs respectively.

Figure 10:
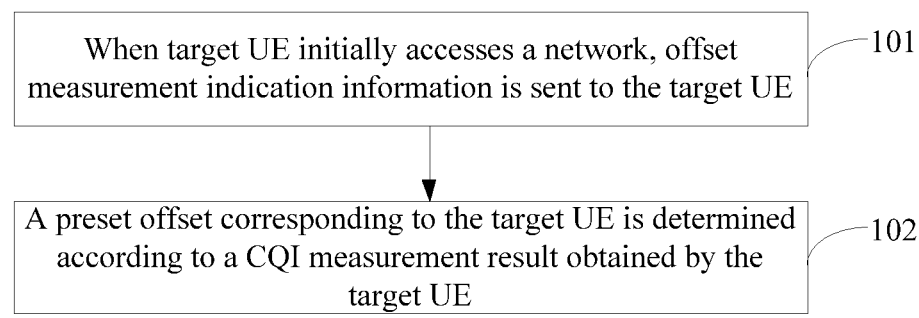
FIG. 10 is a flowchart of another method for determining CQI information according to some embodiments of the present disclosure.

FIG. 10 is a flowchart of another method for determining CQI information according to some embodiments. The operation illustrated in block 10 may include the following operations.

At block 101, when the target UE initially accesses a network, offset measurement indication information is sent to the target UE. The offset measurement indication information is to instruct the target UE to measure the CQI information in an intra-device interference occurrence period and an intra-device interference-free period in the interference sub-band respectively.

In an embodiment of the present disclosure, the offset measurement indication information may also be a switching value indicating whether to perform offset measurement or not, and may further include the frequency range of the interference sub-band and a measurement result reporting mode.

Similarly, the base station may load the offset measurement indication information into the higher-layer signaling and the physical-layer signaling for transmission to the target UE.

At block 102, the preset offset corresponding to the target UE is determined according to a CQI measurement result obtained by the target UE.

The target UE, after performing CQI measurement based on the offset measurement indication information, reports the CQI measurement result to the base station according to a preset measurement result reporting mode to enable the base station to determine the preset offset corresponding to the target UE according to the CQI measurement result.

In some embodiments of the present disclosure, according to different CQI measurement result reporting modes for the target UE, implementation of the operation illustrated in block 102 may also include two manners.

A first manner: the target UE reports an original measured CQI value to the base station.

Figure 11:
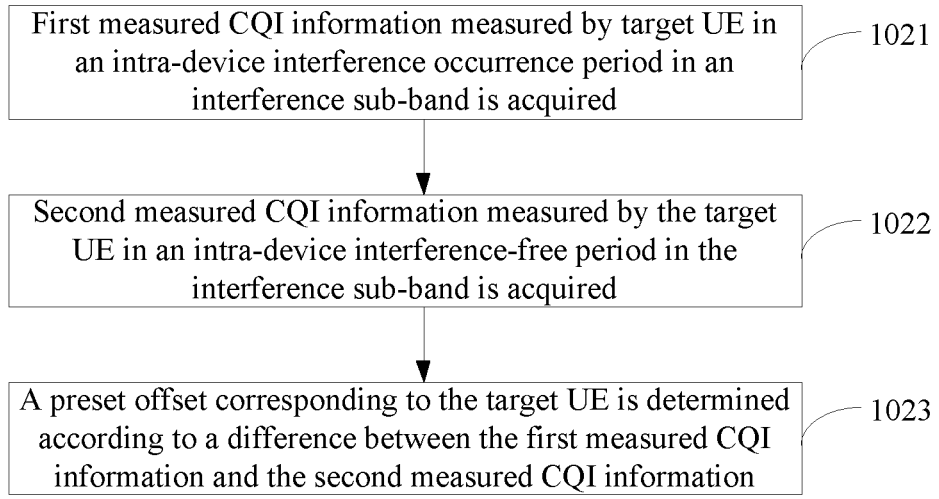
FIG. 11 is a flowchart of another method for determining CQI information according to some embodiments of the present disclosure.

FIG. 11 is a flowchart of another method for determining CQI information according to some embodiments. The operation illustrated in block 102 may include the following operations.

At block 1021, first measured CQI information measured by the target UE in the intra-device interference occurrence period in the interference sub-band is acquired.

For example, in FIG. 6C, the base station may instruct the target UE to send original measured values, measured in the time-frequency range (T1, Wg), of all or a preset number of reference signal sampling points to the base station.

At block 1022, second measured CQI information measured by the target UE in the intra-device interference-free period in the interference sub-band is acquired.

Similarly, the base station may instruct the target UE to send the original measured value, measured at the same frequency-domain position in the time-frequency range (T2, Wg), of the reference signal to the base station.

At block 1023, the preset offset corresponding to the target UE is determined according to a difference between the first measured CQI information and the second measured CQI information.

A great number of reference signals are laid out in a time-frequency resource range, which belongs to a symbol-level layout. For example, there are 100 reference signal sampling points, and the first measured CQI information may be original measured values, for example, RSRP values, measured by the target UE when the intra-device interference occurs, of 100 reference signals.

Similarly, the second measured CQI information is original measured values, measured by the target UE when no intra-device interference occurs, of the 100 reference signals.

Since frequency-domain positions of the 100 reference signal sampling points are the same, the difference between the first measured CQI information and the second measured CQI information may be calculated to accurately calculate the intra-device interference influence value, i.e., the preset offset, of the target UE.

When the difference between the first measured CQI information and the second measured CQI information is calculated, a difference between the two original measured values of each sampling point may be calculated to obtain 100 difference values, and then an average value of the 100 difference values is calculated; or, average values of the 100 original measured values in the first measured CQI information and the second measured CQI information may be calculated at first respectively, and then a difference between the two average values is calculated.

It may be seen that the preset offset determined according to the abovementioned method may be the difference between the original measured values such as the RSRP or RSRQ values, represented as $\Delta P$ and $\Delta Q$ respectively.

Furthermore, in some other embodiments of the present disclosure, the base station may further calculate, based on the difference between the original measured values, a CQI level offset, which may be represented as $\Delta C$, caused by the intra-device interference according to a related algorithm.

In the embodiments of the present disclosure, the base station may accurately calculate the preset offset according to original measured values, measured by the target UE under different situations, of reference signals, so that calculation resources of the target UE may be saved. Then, the base station may transmit the preset offset of the target UE to the target UE through preset control signaling, for example, the control signaling carrying the CQI modification indication information, to enable the target UE to subsequently modify the CQI information by use of the preset offset.

A second manner: the target UE calculates the preset offset according to an original measured value of DL reference signal strength and reports the preset offset to the base station.

Figure 12:
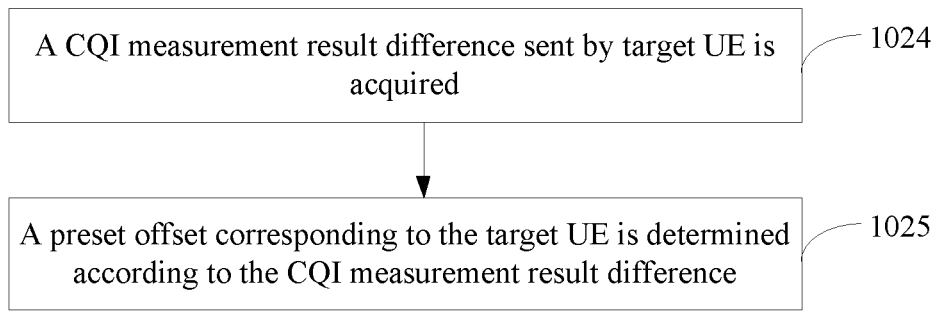
FIG. 12 is a flowchart of another method for determining CQI information according to some embodiments of the present disclosure.

FIG. 12 is a flowchart of another method for determining CQI information according to some embodiments. The operation illustrated in block 102 may include the following operations.

At block 1024, a CQI measurement result difference sent by the target UE is acquired. The CQI measurement result difference is a difference between measurement results obtained by the target UE in the intra-device interference occurrence period and the intra-device interference-free period in the interference sub-band.

In the embodiments of the present disclosure, if the base station instructs the target UE to report a difference between two original measured values, the target UE, after measuring the original measured values of the reference signal strength in the intra-device interference occurrence period and the intra-device interference-free period respectively, may calculate a difference between the original measured values according to the abovementioned manner.

If the base station instructs the target UE to report a CQI level difference, the target UE may further calculate, based on the difference between the original measured values, the CQI level difference caused by the intra-device interference.

The difference between the original measured values and the CQI level difference are collectively referred to as the CQI measurement result difference, and the CQI measurement result difference is reported to the base station.

At block 1025, the preset offset corresponding to the target UE is determined according to the CQI measurement result difference.

In the same manner as above, the preset offset, determined by the base station, of the target UE may be ΔP, ΔQ or ΔC.

If the base station expects that the finally determined preset offset is ΔC while the target UE sends ΔP or ΔQ in operation illustrated in 1024, the base station may also convert ΔP or ΔQ into ΔC by use of a related algorithm.

In the embodiments of the present disclosure, if the CQI measurement result difference value reported by the target UE is the representation form, expected by the base station, of the preset offset, for example, ΔC, the base station is not required to transmit the preset offset to the target UE, so that the signaling overhead may be reduced.

In some other embodiments of the present disclosure, the operation illustrated in block 10 may also be executed before operation illustrated in block 1312-1.

In the embodiments of the present disclosure, the base station may accurately determine the intra-device interference influence value in the target UE according to the reference signal measurement results in intra-device interference occurrence period and intra-device interference-free period, so that the CQI information in the interference sub-band may be accurately modified, accuracy of scheduling the target UE by the base station in the interference sub-band may further be improved, accuracy of a system DL transmission rate may further be improved, and the system performance may be improved.

Figure 13:
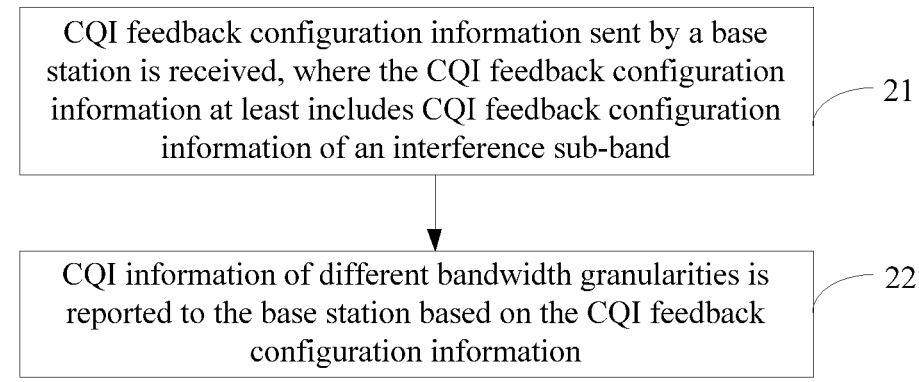
FIG. 13 is a flowchart of a method for determining CQI information according to some embodiments of the present disclosure.

Correspondingly, the present disclosure also provides a method for determining CQI information, which is applied to UE. FIG. 13 is a flowchart of a method for determining CQI information according to some embodiments. The method may include the following operations.

At block 21, CQI feedback configuration information sent by a base station is received. The CQI feedback configuration information at least includes CQI feedback configuration information of an interference sub-band. The interference sub-band is a DL working frequency range involved in intra-device interference.

The operation illustrated in block 21 corresponds to the operation illustrated in block 12. In an embodiment of the present disclosure, the CQI feedback configuration information of the interference sub-band may further include frequency range information. The base station may instruct the UE to report CQI information of part of a frequency range of the interference sub-band.

At block 22, CQI information of different bandwidth granularities is reported to the base station based on the CQI feedback configuration information.

The UE, after receiving the CQI feedback configuration information, performs related configuration for CQI feedback, measures the CQI information of the different bandwidth granularities based on the CQI feedback configuration information and then reports the CQI information of the different bandwidth granularities to the base station according to a preset reporting mode such as a periodic feedback or aperiodic feedback mode.

In the embodiments of the present disclosure, the CQI information reported to the base station by the UE at least includes CQI information of the interference sub-band.

A process that the UE reports the CQI information will specifically be described below in combination with a specific example and according to the three situations of the reporting granularity in operation illustrated in block 112.

There is made such a hypothesis that a system bandwidth is 3,420 MHz to 3,480 MHz, the frequency range of the interference sub-band being 3,420 MHz to 3,460 MHz and a frequency range of an interference-free sub-band being 3,460 MHz to 3,480 MHz.

Corresponding to the first situation, namely the reporting granularity is the interference sub-band and the interference-free sub-band.

The target UE may measure DL reference signals in the interference sub-band 3,420 MHz to 3,460 MHz and the interference-free sub-band 3,460 MHz to 3,480 MHz to obtain measurement results respectively. The measurement result may be an average value calculated according to original measured values of RSRPs or RSRQs of all reference signals. Then, corresponding CQI levels are determined according to the measurement results, and the CQI levels of the interference sub-band and the interference-free sub-band are fed back to the base station respectively.

Corresponding to the second situation, namely the reporting granularity is the broadband and the interference sub-band.

Under such a configuration situation, the target UE may acquire original measured values, for example, RSRP or RSRQ values, of DL reference signals in the whole system bandwidth 3,420 MHz to 3,480 MHz, calculate an average value of the original measured values of the whole bandwidth and then determine and report a CQI level of the broadband to the base station.

Similarly, the original measured values of the reference signals in the interference sub-band 3,420 MHz to 3,460 MHz are selected from the original measured values of the whole system bandwidth, and then the CQI level of the interference sub-band is determined and reported to the base station.

Corresponding to the third situation, namely the reporting granularity includes the interference sub-band, the interference-free sub-band or the broadband and further includes a sub-band selected by the UE and a sub-band configured at the higher layer.

Under such a configuration situation, the UE may also select one or more sub-bands from sub-bands in the system bandwidth for CQI information reporting, or, perform CQI reporting according to the sub-band configured at the higher layer.

Figure 14:
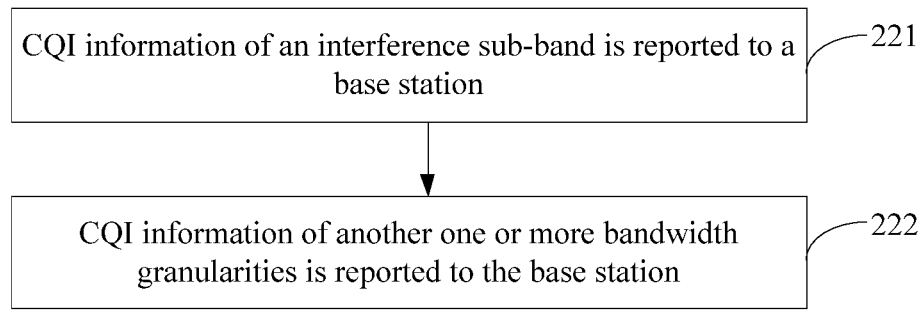
FIG. 14 is a flowchart of another method for determining CQI information according to some embodiments of the present disclosure.

In case of division according to the reporting granularity, FIG. 14 is a flowchart of another method for determining CQI information according to some embodiments. The operation illustrated in block 22 may include the following operations.

At block 221, CQI information of the interference sub-band is reported to the base station.

At block 222, CQI information of another one or more bandwidth granularities is reported to the base station. The another one or more bandwidth granularities include a broadband, a sub-band specified by target UE, or a sub-band configured at a higher layer.

In some embodiments of the present disclosure, when reporting the CQI information of the interference sub-band to the base station, the UE may report obtained original CQI information to the base station; or, when reporting the CQI information of the interference sub-band to the base station, the UE may modify the original CQI information according to an instruction of the base station and then report the modified CQI information to the base station.

Figure 15:
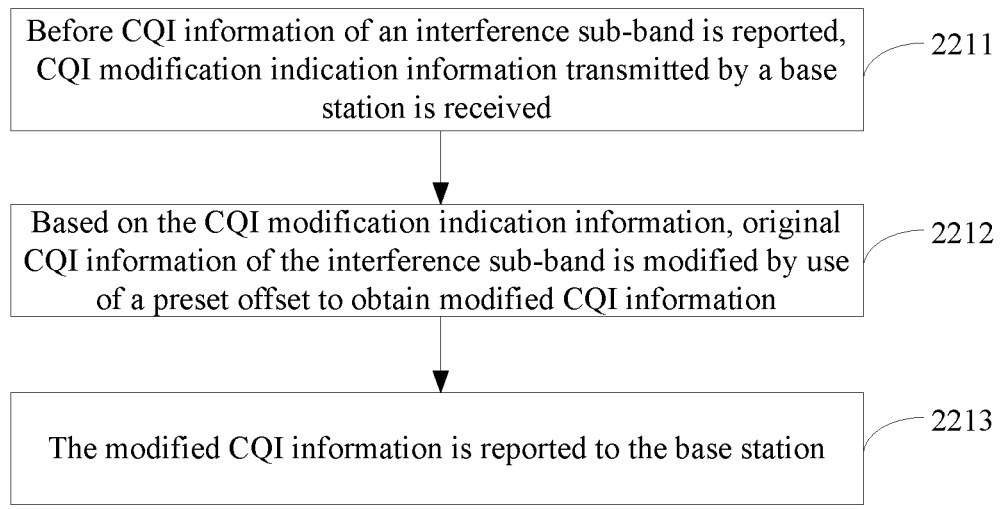
FIG. 15 is a flowchart of another method for determining CQI information according to some embodiments of the present disclosure.

FIG. 15 is a flowchart of another method for determining CQI information according to some embodiments. The operation illustrated in block 221 may include the following operations.

At block 2211, before the CQI information of the interference sub-band is reported, CQI modification indication information transmitted by the base station is received.

The operation illustrated in block 2211 corresponds to the operation illustrated in block 1312-1 in FIG. 7, and is applied to the application scenario illustrated in FIG. 6C or FIG. 6D.

The CQI modification indication information is used to instruct the UE to modify original CQI information of the interference sub-band and report the modified CQI information to the base station.

At block 2212, based on the CQI modification indication information, original CQI information of the interference sub-band is modified by use of a preset offset to obtain modified CQI information.

In the embodiments of the present disclosure, the original CQI information may be an original measured value of reference signal strength in the interference sub-band or an original CQI level determined according to the original measured value.

The preset offset is an intra-device interference influence value corresponding to the interference sub-band in the UE, i.e., a difference between reference signal strength measured when there is no intra-device interference and reference signal strength measured when there is intra-device interference in the interference sub-band, or a CQI level offset determined according to the difference.

If the preset offset is preset in the UE before the modification indication information is received, for example, it is transmitted to the UE by the base station before, the UE, after measuring the original CQI information of the interference sub-band, may directly determine the modified CQI information based on the preset offset and the original CQI information.

In some other embodiments of the present disclosure, the base station may further transmit the preset offset corresponding to the intra-device interference to the UE at the same time of transmitting the CQI modification indication information to the UE, which is applied to the condition that the preset offset is not stored in the UE at present, for example, the condition that the UE initially accesses a network or the UE accesses the network again after system initialization.

In some other embodiments of the present disclosure, for reducing a signaling overhead, the base station may transmit the CQI modification indication information including the preset offset by use of a piece of control signaling.

Correspondingly, the UE modifies the measured original CQI information of the interference sub-band according to the preset offset acquired in real time to obtain the modified CQI information.

At block 2213, the modified CQI information is reported to the base station.

Figure 16:
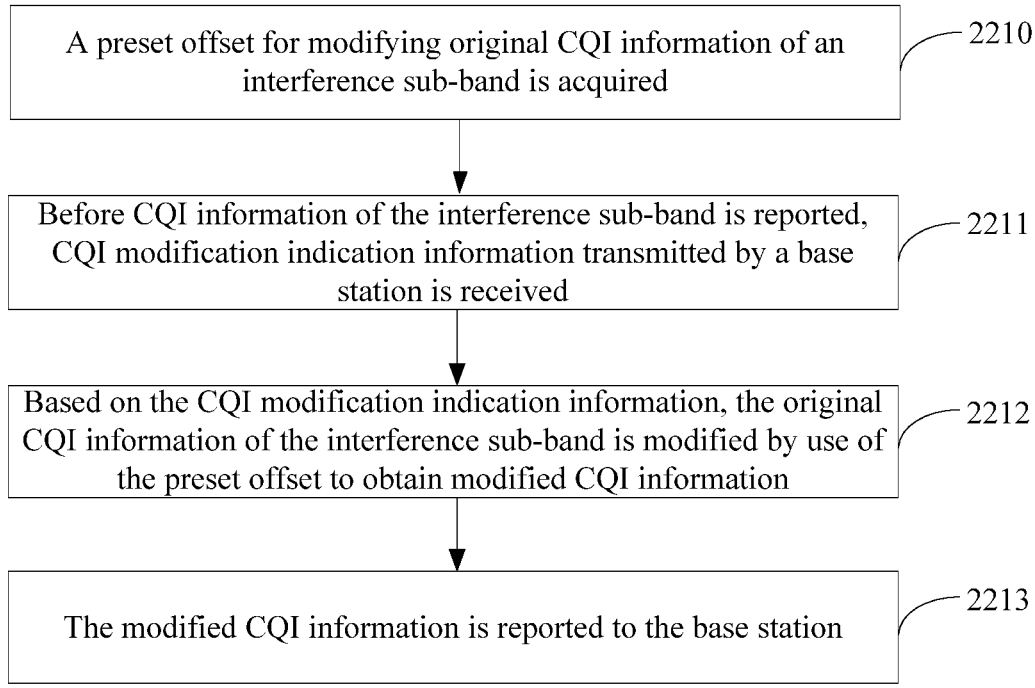
FIG. 16 is a flowchart of another method for determining CQI information according to some embodiments of the present disclosure.

In some other embodiments of the present disclosure, FIG. 16 is a flowchart of another method for determining CQI information according to some embodiments. Before the operation illustrated in block 2211, the operation illustrated in block 221 may further include the following operation.

At block 2210, the preset offset for modifying the original CQI information of the interference sub-band is acquired.

That is, the UE may acquire the preset offset before it is necessary to modify the interference sub-band. The preset offset may be an offset of the original measured value, for example, RSRP and RSRQ, of the reference signal strength and may also be CQI level offset caused by the intra-device interference.

At block 2210, the following two acquisition manners may be adopted.

A first acquisition manner: the preset offset transmitted by the base station is received.

The preset offset may be an offset preset by the base station and is applied to the whole system bandwidth. For example, it is 50 dB, to notify the UE that the difference value of the reference signal strength measured when there is intra-device interference and there is no intra-device interference in the interference sub-band is calculated according to 50 dB in a unified manner.

Or, corresponding to the embodiments illustrated in FIG. 11, the preset offset transmitted by the base station and obtained in block 1023 is received.

A second acquisition manner: it is measured by the target UE according to measurement indication information of the base station.

Figure 17:
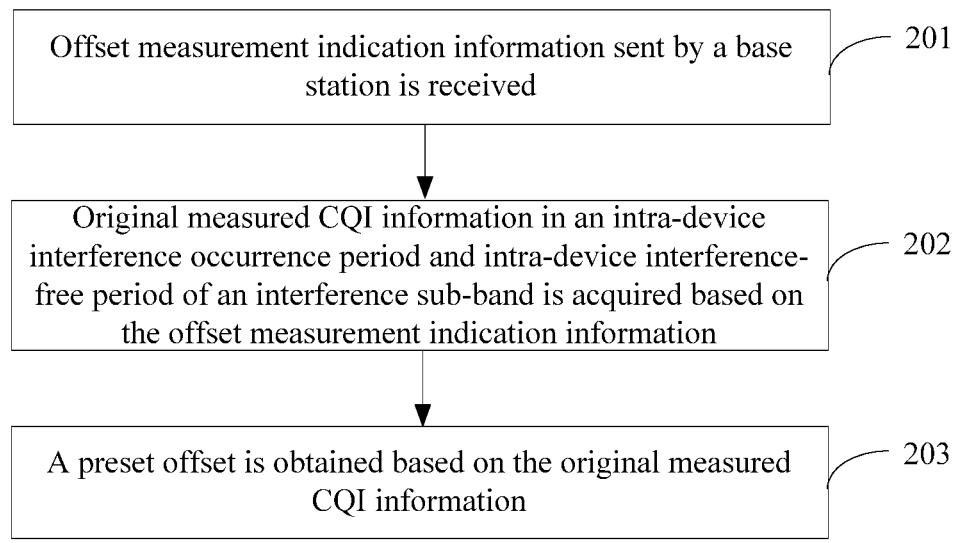
FIG. 17 is a flowchart of another method for determining CQI information according to some embodiments of the present disclosure.

FIG. 17 is a flowchart of another method for determining CQI information according to some embodiments. The operation illustrated in block 2210 may include the following operations.

At block 201, offset measurement indication information sent by the base station is received.

The offset measurement indication information is used to instruct the UE to measure the CQI information in an intra-device interference occurrence period and an intra-device interference-free period in the interference sub-band.

The operation illustrated in block 201 corresponds to the operation illustrated in block 101 in the embodiments illustrated in FIG. 10.

At block 202, original measured CQI information in an intra-device interference occurrence period and intra-device interference-free period of the interference sub-band is acquired respectively according to the offset measurement indication information.

In the embodiments of the present disclosure, the offset measurement indication information includes measurement indication information and may further include a measurement frequency range, the number of reference signal sampling points, a number of times of measurement and the like.

For example, there are 100 reference signal sampling points. The UE measures received strength of 100 specified reference signals when the intra-device interference occurs in the interference sub-band to obtain original measured values, for example, RSRP values.

Similarly, the UE measures strength of the 100 reference signals at the same time-frequency resource positions when no intra-device interference occurs in the interference sub-band to obtain other original measured values.

The original measured values obtained under different situations, of the reference signal strength are collectively referred to as original measured CQI information.

At block 203, the preset offset is obtained based on the original measured CQI information.

In some embodiments of the present disclosure, implementation of the operation illustrated in block 203 also includes two situations.

A first situation: the base station calculates and sends the preset offset to the UE.

Figure 18:
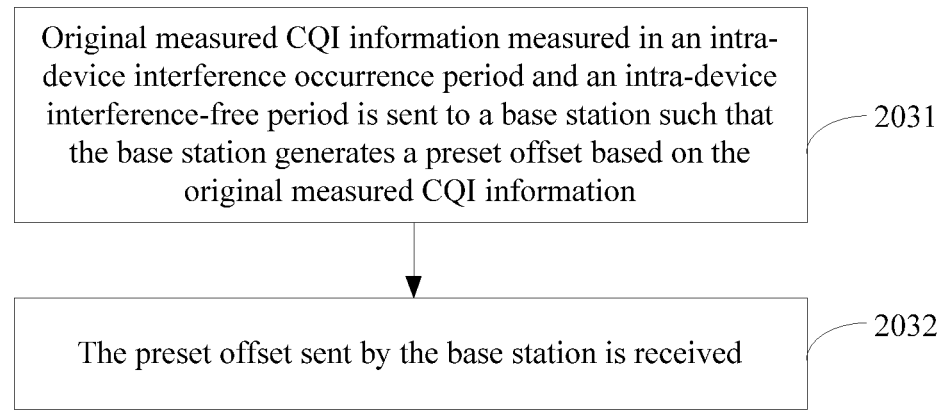
FIG. 18 is a flowchart of another method for determining CQI information according to some embodiments of the present disclosure.

FIG. 18 is a flowchart of another method for determining CQI information according to some embodiments. The operation illustrated in block 203 may include the following operations.

At block 2031, the original measured CQI information measured in the intra-device interference occurrence period and the intra-device interference-free period is sent to the base station respectively such that the base station generates the preset offset based on the original measured CQI information.

The operation illustrated in block 2031 corresponds to operations illustrated in block 1021 and block 1022. The UE sends the original measured values, measured by use of the same sampling granularity in the same frequency range under different intra-device interference situations, of the reference signals to the base station for the base station to calculate the preset offset according to the original measured CQI values.

At block 2032, the preset offset sent by the base station is received.

In the embodiments of the present disclosure, the UE is only required to measure the reference signal strength in the interference sub-band and send the original measured values to the base station for the base station to calculate the preset offset. Since calculation of the offset requires relatively more memory resources, calculating the offset by the base station may avoid occupation of memory resources of the UE and further reduce influence on service transmission of the UE. In addition, since the base station has more calculation resources than the UE, the preset offset may be rapidly calculated, and acquisition efficiency of the preset offset is improved.

A second situation: the UE calculates the preset offset and notifies it to the base station.

Figure 19:
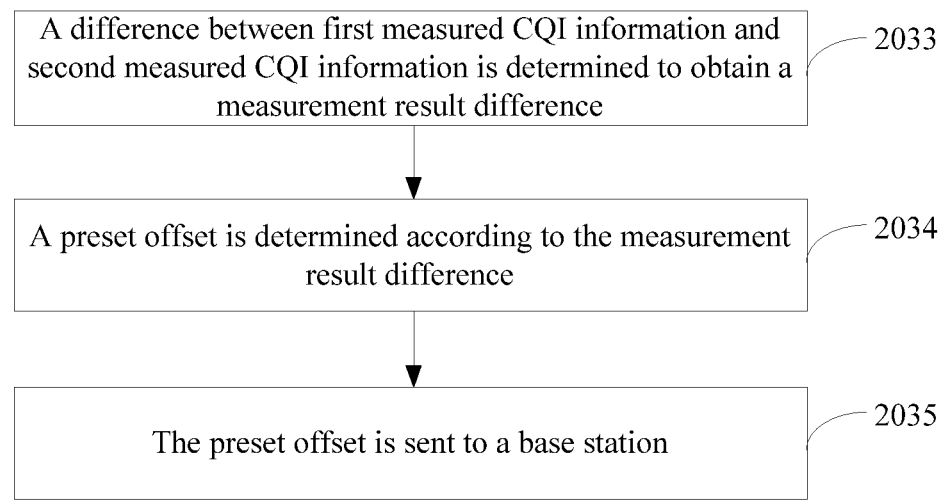
FIG. 19 is a flowchart of another method for determining CQI information according to some embodiments of the present disclosure.

FIG. 19 is a flowchart of another method for determining CQI information according to some embodiments. The operation illustrated in block 203 may include the following operations.

At block 2033, a difference between first measured CQI information and second measured CQI information is determined to obtain a measurement result difference.

The first measured CQI information is original CQI information measured in the intra-device interference occurrence period in the interference sub-band. The second measured CQI information is original CQI information measured in the intra-device interference-free period in the interference sub-band.

In the above example, there is made such a hypothesis that the first measured CQI information is RSRP values of 100 reference signal sampling points under the condition that the intra-device interference occurs and the second measured CQI information is RSRP values of 100 reference signal sampling points under the condition that no intra-device interference occurs.

Since frequency-domain positions of the 100 reference signal sampling points are the same, the difference between the first measured CQI information and the second measured CQI information may be calculated to accurately calculate the intra-device interference influence value, i.e., the preset offset, of the target UE.

When the difference between the first measured CQI information and the second measured CQI information is calculated, a difference between the two original measured values of each sampling point may be calculated to obtain 100 difference values, and then an average value of the 100 difference values is calculated; or, average values of the 100 original measured values in the first measured CQI information and the second measured CQI information may be calculated at first respectively, and then a difference between the two average values is calculated to obtain the measurement result difference.

At block 2034, the preset offset is determined according to the measurement result difference.

In the embodiments of the present disclosure, the difference between the original measured values, for example, the RSRP or RSRQ values, i.e., the measurement result difference, may be determined as the preset offset, represented as $\Delta P$ and $\Delta Q$ respectively.

In some other embodiments of the present disclosure, the UE may further calculate, according to the measurement result difference, a CQI level offset, which may be represented as $\Delta C$, caused by the intra-device interference according to a related algorithm.

At block 2035, the preset offset is sent to the base station.

In the embodiments of the present disclosure, the UE may calculate the preset offset according to the original measured values, measured under different intra-device interference situations, of the reference signal strength in the interference sub-band and store and report the preset offset to the base station as capability information of the UE. Since the base station is not required to transmit the preset offset to the UE, the signaling overhead for transmission of the preset offset to the UE by the base station may be reduced.

Detailed descriptions are made above to the condition that the CQI configuration information, determined by the base station, of the target UE at least includes the CQI feedback information of the interference sub-band.

If a CQI feedback manner of an LTE system is still adopted in an LTE-NR interworking network distribution stage, namely the CQI information of the interference sub-band is not independently fed back, considering influence of the intra-device interference, the following CQI information determination manner may be adopted in some embodiments of the present disclosure.

Figure 20:
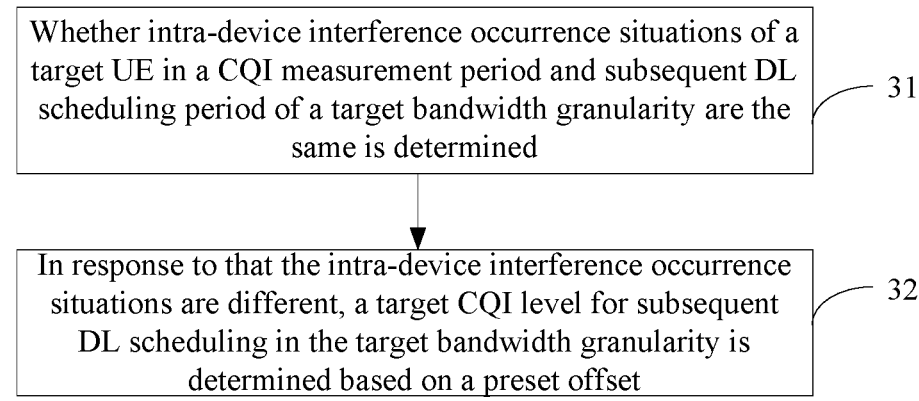
FIG. 20 is a flowchart of a method for determining CQI information according to some embodiments of the present disclosure.

FIG. 20 is a flowchart of a method for determining CQI information according to some embodiments. The method is applied to a base station and may include the following operations.

At block 31, whether intra-device interference occurrence situations of a target UE in a CQI measurement period and subsequent DL scheduling period of a target bandwidth granularity are the same is determined.

According to related knowledge, in an LTE system, a CQI reporting granularity may be a broadband, a sub-band selected by the UE and a sub-band configured at the higher layer, as illustrated in Table 3.

TABLE 3

| Reporting mode | Reporting granularity |
|---|---|
| Periodic | Broadband, sub-band selected by UE |
| Aperiodic | Broadband, sub-band selected by UE, sub-band configured at the higher layer |

The target bandwidth granularity may be any of the abovementioned reporting granularities, and the target bandwidth granularity includes a frequency range involved in intra-device interference.

Implementation of the operation illustrated in block 31 is similar to that of the operation illustrated in block 1311. The base station may determine whether the intra-device interference occurrence situations in the measurement period and scheduling period of the same bandwidth granularity are the same or not according to reporting bandwidth granularity information and subsequent scheduling configuration information in CQI feedback configuration information.

At block 32, in response to that the intra-device interference occurrence situations are different, a target CQI level for subsequent DL scheduling in the target bandwidth granularity is determined based on to a preset offset.

The preset offset may be a CQI level offset caused by the intra-device interference and may also be an offset, caused by the intra-device interference, of a measured value, for example, RSRP or RSRQ, of a reference signal.

If the preset offset is the CQI level offset caused by the intra-device interference, in some embodiments of the present disclosure, the target UE or the base station may modify an original CQI level of the measurement period according to the CQI level offset to obtain a target CQI level of the target UE in the subsequent DL scheduling period.

A way the base station acquires the target CQI level is described in combination with the application scenarios illustrated in FIG. 6C and FIG. 6D. The base station may modify an original CQI level reported by the target UE in a period T1 to determine a target CQI level for DL scheduling in a period T2.

If the preset offset is the CQI level offset, for example, 3, and as illustrated in FIG. 6C, if the reporting granularity is a system bandwidth W0 and the CQI level reported by the target UE in the period T1 is 5, the base station may determine that the target CQI level for DL scheduling in the period T2 is 5+3=8. That is, the base station, when scheduling the target UE on the system bandwidth in the period T2, performs DL data transmission to the target UE by use of a modulation and coding scheme corresponding to the CQI level 8 and a corresponding data rate, so that an output and transmission rate is increased.

Instead, for the application scenario illustrated in FIG. 6D, if the CQI level reported by the target UE in the period T1 is 8, the base station may determine that the target CQI level for DL scheduling in the period T2 is 8−3=5. Therefore, the base station, when scheduling the target UE in the period T2 where a channel condition gets bad, may transmit data at a relatively low rate to ensure data transmission reliability and accuracy.

In the embodiments of the present disclosure, the base station may determine whether the intra-device interference occurrence situations in the CQI measurement period and subsequent scheduling period of the target bandwidth granularity are the same or not according to subsequent scheduling configuration information for the target UE. The frequency range of the target bandwidth granularity includes a DL frequency range involved in the intra-device interference. When the intra-device interference occurrence situations in different periods of the target bandwidth granularity are different, influence of the intra-device interference on CQI measurement may be modified by use of the preset offset to accurately determine the target CQI level for subsequent scheduling and further determine a more accurate modulation and coding scheme for subsequent scheduling according to the target CQI level, so that accuracy in subsequent scheduling of the target UE by the base station is improved, a DL data rate of the system is reasonably allocated, and system performance is improved.

In some other embodiments of the present disclosure, if the preset offset is the offset, caused by the intra-device interference, of the original measured value, for example, RSRP or RSRQ, the base station, before the target UE reports the CQI level, is required to instruct the target UE to modify the CQI level.

Figure 21:
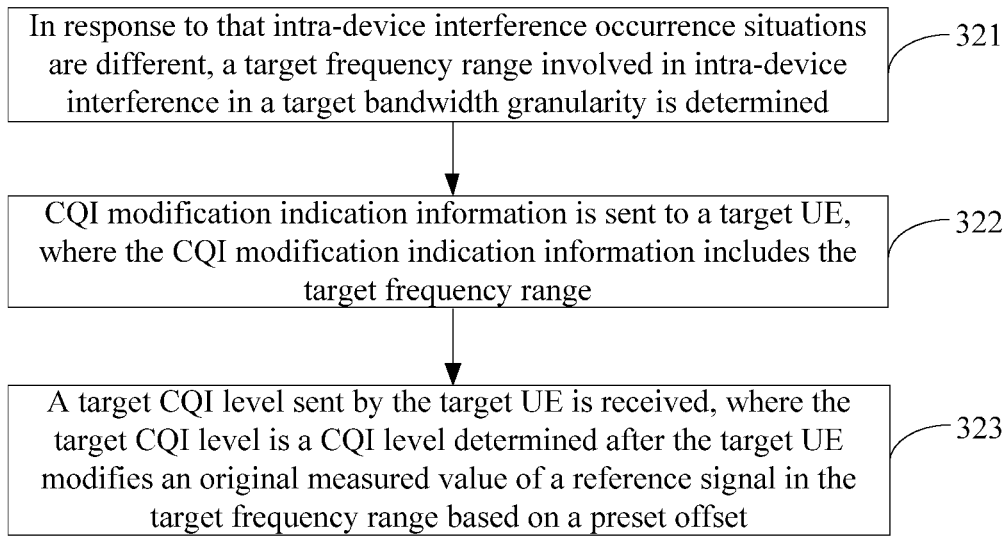
FIG. 21 is a flowchart of another method for determining CQI information according to some embodiments of the present disclosure.

FIG. 21 is a flowchart of another method for determining CQI information according to some embodiments. Operation illustrated in block 32 may include the following operations.

At block 321, in response to that the intra-device interference occurrence situations are different, a target frequency range involved in intra-device interference in the target bandwidth granularity is determined.

The target bandwidth granularity may be a broadband, a sub-band selected by the UE, or a sub-band configured at the higher layer.

At block 322, CQI modification indication information is sent to the target UE. The CQI modification indication information includes the target frequency range.

The CQI modification indication information is used to instruct the target UE to modify an original measured value of reference signal strength in the target bandwidth granularity and then determine the CQI level of the target bandwidth granularity.

At block 323, the target CQI level sent by the target UE is received. The target CQI level is a CQI level determined after the target UE modifies the original measured value of a reference signal in the target frequency range based on the preset offset.

In the embodiments of the present disclosure, when the preset offset determined by the base station is an offset of the measured value of the reference signal, under the condition that the base station notifies the preset offset to the target UE in advance, the base station may send the CQI modification indication information to the target UE to enable the target UE to modify the original value, namely performing modification from an information source, according to the preset offset to obtain a more accurate target CQI level after acquiring the original measured value of the reference signal.

In some other embodiments of the present disclosure, if the preset offset is not preset in the target UE, for example, the target UE initially accesses a network or the target UE accesses the network again after system initialization, the base station may further send the preset offset to the target UE before transmitting the CQI modification indication information to the target UE or when transmitting the CQI modification indication information to the target UE.

The embodiments is applied to an application scenario that the target UE acquires the preset offset for the first time. According to a characteristic of a mobile communication network, the base station notifies the preset offset to the target UE through control signaling to prepare in advance for subsequent CQI information modification of the target UE and improve target CQI information acquisition efficiency.

In some other embodiments of the present disclosure, if the base station is intended to acquire the preset offset corresponding to the target UE, when the target UE accesses the network for the first time, for example, it is started for the first time to access the network, the base station may also instruct the target UE to perform measurement when the intra-device interference occurs and no intra-device interference occurs in a band involved in the intra-device interference respectively to further obtain an accurate preset offset corresponding to the target UE. This operation may refer to detailed descriptions in the embodiments illustrated in FIG. 10 and elaborations thereof are omitted herein.

In the embodiments of the present disclosure, considering that different UEs have different hardware performances and different intra-device interference shielding effects, for obtaining the preset offset corresponding to the target UE, the base station may further instruct the target UE to measure reference signal strength of the same frequency-domain resource under the conditions that the intra-device interference occurs and no intra-device interference occurs respectively to accurately determine the preset offset of the target UE according to a measurement result difference, so that accuracy of target CQI information is further improved.

Figure 22:
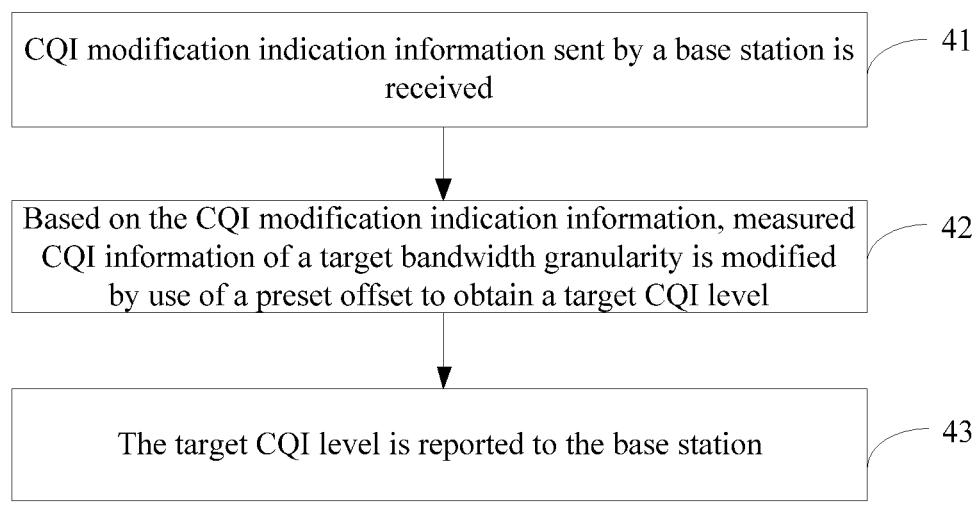
FIG. 22 is a flowchart of a method for determining CQI information according to some embodiments of the present disclosure.

Correspondingly, the present disclosure also provides a method for determining CQI information, which is applied to UE. FIG. 22 is a flowchart of a method for determining CQI information according to some embodiments. The method includes the following operations.

At block 41, CQI modification indication information sent by a base station is received.

The CQI modification indication information is used to instruct the target UE to modify measured CQI information of a target bandwidth granularity for reporting to the base station.

At block 42, based on the CQI modification indication information, measured CQI information of a target bandwidth granularity is modified according to a preset offset to obtain a target CQI level.

In the same manner as above, if the preset offset is a CQI level offset caused by intra-device interference, the target UE may perform offsetting on a determined original CQI level to obtain the target CQI level.

In some other embodiments of the present disclosure, the CQI modification indication information may further include target frequency range information involved in the intra-device interference in the target bandwidth granularity. If the preset offset is an offset, caused by the intra-device interference, of an original measured value, for example, RSRP or RSRQ, the target UE, after acquiring an original measured value of reference signal strength in a target frequency range, performs modification according to the offset of the original measured value, for example, the RSRP or the RSRQ, and determines the target CQI level according to a modified reference signal strength value.

Figure 23:
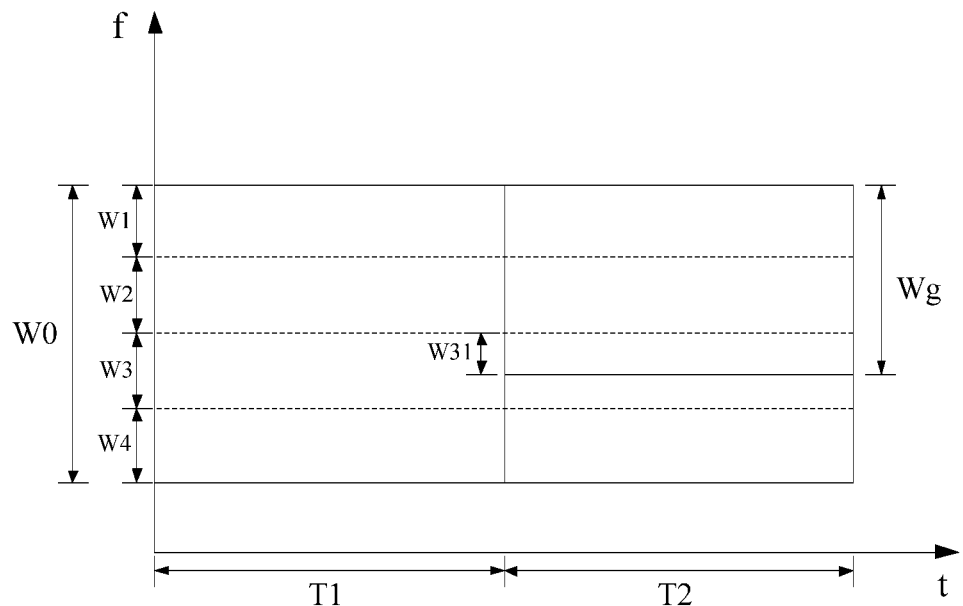
FIG. 23 is a schematic diagram illustrating an application scenario of CQI information determination according to some embodiments of the present disclosure.

FIG. 23 is a schematic diagram illustrating an application scenario of CQI information determination according to some embodiments. There is made such a hypothesis that a CQI reporting granularity configured for the target UE by the base station is a sub-band selected by the UE. In this mode, the target UE is required to report a CQI of a broadband to the base station, i.e., a CQI level of a time-frequency resource (W0, T1), and is also required to report a CQI level of the sub-band selected by the UE. There is made such a hypothesis that the UE selects to report a CQI level of a sub-band W3.

Since intra-device interference is about to occur on an interference sub-band Wg when the base station subsequently schedules the target UE, the base station sends the CQI modification indication information to the target UE and notifies the UE of the target frequency range where the intra-device interference is about to occur.

For example, the target reporting bandwidth granularity is the sub-band W3 selected by the target UE, and the target UE may determine the target frequency range W31 in the sub-band W3. If the preset offset is the RSRP offset, in a specific process of determining a target CQI level of the sub-band W3, after the target UE measures an original RSRP value of each DL reference signal in the sub-band W3, in a manner, the original RSRP values corresponding to the target frequency range W31 may be modified according to the RSRP offset, for example, the preset RSRP offset is deduced from all of them, to obtain modified RSRP values of the target frequency range W31, and then the target CQI level is calculated in combination with original RSRP values of a remaining frequency range in W3 and according to a related algorithm.

In another manner, an average value of the original RSRP values corresponding to the target frequency range W31 may also be calculated, the average value is modified according to the RSRP offset, and the target CQI level of W3 is calculated in combination with an average value of the original RSRP values of the remaining frequency range in W3 and according to the related algorithm.

A modification process for the CQI of the broadband is similar and elaborations thereof are omitted herein.

At block 43, the target CQI level is reported to the base station.

The target UE, when reporting the target CQI level, may also report a target CQI level of the sub-band in a CQI difference value level reporting manner in the related art to save radio resources.

Correspondingly, in some other embodiments of the present disclosure, the target UE, before receiving the CQI modification indication information or when receiving the CQI modification indication information, may further receive the preset offset sent by the base station. This process is like the operation illustrated in block 2210 in the embodiments illustrated in FIG. 16.

In some other embodiments of the present disclosure, the target UE may also perform measurement when the intra-device interference occurs and no intra-device interference occurs in the interference sub-band according to offset measurement indication information transmitted by the base station respectively, thereby determining the preset offset corresponding to the target UE. A specific process may refer to the descriptions in the embodiments illustrated in FIG. 17 to FIG. 19.

For simple description, each of the abovementioned method embodiments is expressed as a combination of a series of operations, but those skilled in the art should know that the present disclosure is not limited to the described operation sequence because some operations may be executed in other sequences or at the same time according to the present disclosure.

Second, those skilled in the art should also know that all the embodiments described in the specification are optional embodiments and involved operations and modules are not always required by the present disclosure.

Corresponding to the abovementioned application function realization method embodiments, the present disclosure also provides embodiments of an application function realization device and a corresponding terminal.

Figure 24:
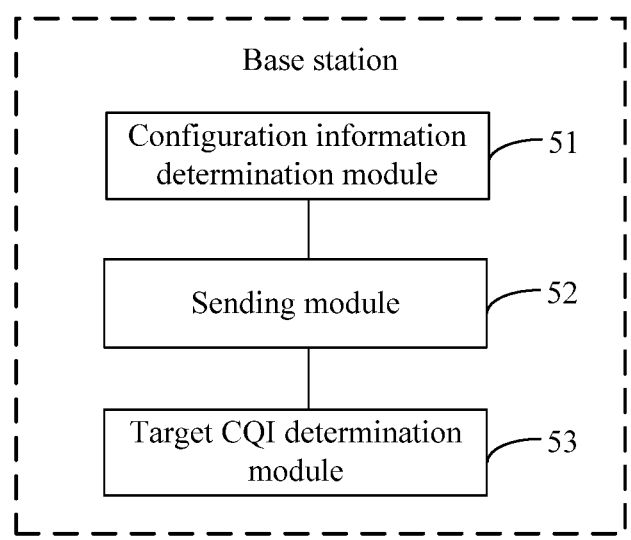
FIG. 24 is a block diagram of a base station according to some embodiments of the present disclosure.

FIG. 24 is a block diagram of a base station according to some embodiments. The base station may include a configuration information determination module 51, a sending module 52, and a target CQI determination module 53.

The configuration information determination module 51 is configured to determine CQI feedback configuration information of target UE. The CQI feedback configuration information at least includes CQI feedback configuration information of an interference sub-band. The interference sub-band is a DL frequency range involved in intra-device interference;

The sending module 52 is configured to send the CQI feedback configuration information to the target UE.

The target CQI determination module 53 is configured to determine target CQI information for subsequent DL scheduling based on CQI information, reported by the target UE based on the CQI feedback configuration information, of different bandwidth granularities.

Figure 25:
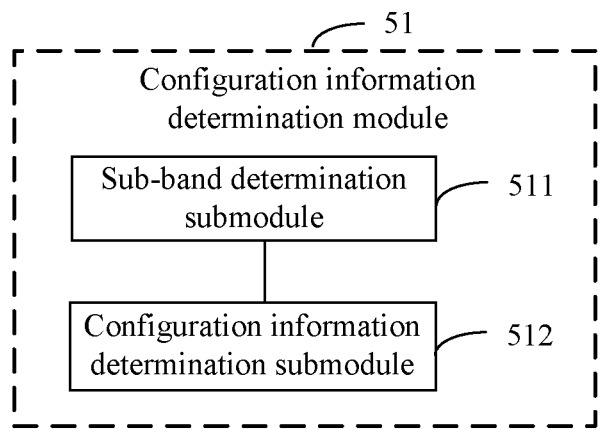
FIG. 25 is a block diagram of another base station according to some embodiments of the present disclosure.

FIG. 25 is a block diagram of another base station according to some embodiments. Based on the base station embodiment illustrated in FIG. 24, the configuration information determination module 51 may include a sub-band determination submodule 511 and a configuration information determination submodule 512.

The sub-band determination submodule 511 is configured to determine, based on radio frequency supporting capability information of the target UE, the interference sub-band involved in the intra-device interference and an interference-free sub-band not involved in the intra-device interference.

The configuration information determination submodule 512 is configured to determine the CQI feedback configuration information of the target UE based on the interference sub-band and the interference-free sub-band.

Figure 26:
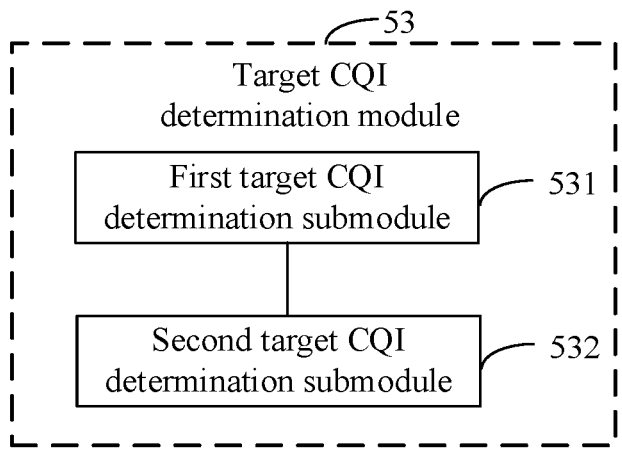
FIG. 26 is a block diagram of another base station according to some embodiments of the present disclosure.

FIG. 26 is a block diagram of another base station according to some embodiments. Based on the base station embodiment illustrated in FIG. 24, the target CQI determination module 53 may include a first target CQI determination submodule 531 and a second target CQI determination submodule 532.

The first target CQI determination submodule 531 is configured to determine target CQI information for subsequent DL scheduling in the interference sub-band based on CQI information, determined by the target UE, of the interference sub-band.

The second target CQI determination submodule 532 is configured to determine target CQI information for subsequent DL scheduling in the interference-free sub-band based on CQI information, determined by the target UE, of another one or more bandwidth granularities.

The interference-free sub-band is a DL frequency range not involved in the intra-device interference and the another one or more bandwidth granularities include a broadband, a sub-band specified by the target UE, or a sub-band configured at the higher layer.

Figure 27:
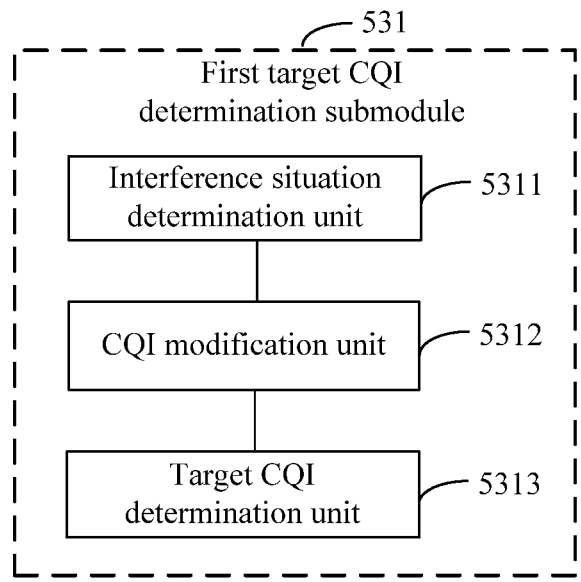
FIG. 27 is a block diagram of another base station according to some embodiments of the present disclosure.

FIG. 27 is a block diagram of another base station according to some embodiments. Based on the base station embodiment illustrated in FIG. 26, the first target CQI determination submodule 531 may include an interference situation determination unit 5311, a CQI modification unit 5312 and a target CQI determination unit 5313.

The interference situation determination unit 5311 is configured to determine whether intra-device interference occurrence situations of the target UE in a CQI measurement period and subsequent DL scheduling period of the interference sub-band are the same or not.

The CQI modification unit 5312 is configured to, in response to that the intra-device interference occurrence situations are different, acquire modified CQI information.

The target CQI determination unit 5313 is configured to determine, based on the modified CQI information, the target CQI information for subsequent DL scheduling in the interference sub-band.

Figure 28:
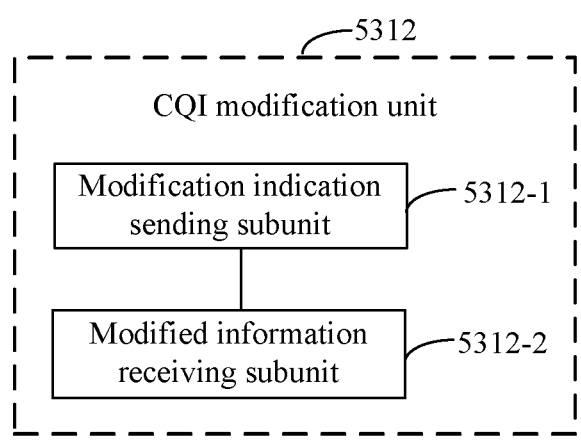
FIG. 28 is a block diagram of another base station according to some embodiments of the present disclosure.

FIG. 28 is a block diagram of another base station according to some embodiments. Based on the base station embodiment illustrated in FIG. 27, the CQI modification unit 5312 may include a modification indication sending subunit 5312-1 and a modified information receiving subunit 5312-2.

The modification indication sending subunit 5312-1 is configured to, before subsequent DL scheduling is executed, send CQI modification indication information to the target UE to instruct the target UE to modify determined original CQI information by use of a preset offset.

The CQI modification indication information in some other embodiments of the present disclosure further can include the preset offset for modifying the original CQI information.

The modified information receiving subunit 5312-2 is configured to receive the modified CQI information reported by the target UE.

Figure 29:
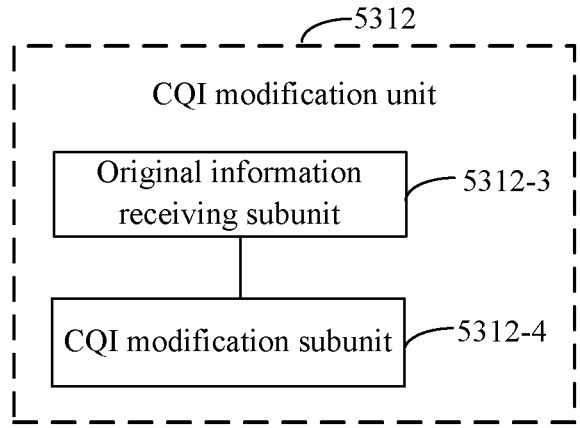
FIG. 29 is a block diagram of another base station according to some embodiments of the present disclosure.

FIG. 29 is a block diagram of another base station according to some embodiments. Based on the base station embodiment illustrated in FIG. 27, the CQI modification unit 5312 may include an original information receiving subunit 5312-3 and a CQI modification subunit 5312-4.

The original information receiving subunit 5312-3 is configured to receive the original CQI information obtained by the target UE in the CQI measurement period of the interference sub-band.

The CQI modification subunit 5312-4 is configured to modify the original CQI information by use of the preset offset to obtain the modified CQI information.

Figure 30:
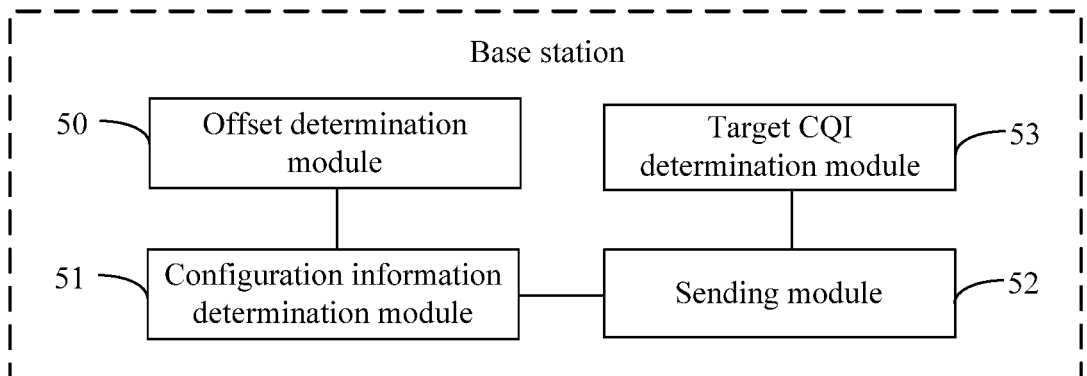
FIG. 30 is a block diagram of another base station according to some embodiments of the present disclosure.

FIG. 30 is a block diagram of another base station according to some embodiments. Based on the base station embodiment illustrated in FIG. 24, the base station may further include an offset determination module 50.

The offset determination module 50 is configured to determine a preset offset corresponding to the target UE. The preset offset is an intra-device interference influence value of the interference sub-band.

Figure 31:
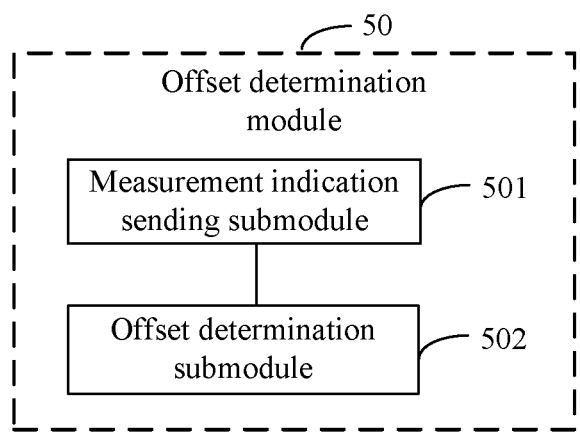
FIG. 31 is a block diagram of another base station according to some embodiments of the present disclosure.

FIG. 31 is a block diagram of another base station according to some embodiments. Based on the base station embodiment illustrated in FIG. 30, the offset determination module 50 may include a measurement indication sending submodule 501 and an offset determination submodule 502.

The measurement indication sending submodule 501 is configured to, when the target UE initially accesses a network, send offset measurement indication information to the target UE. The offset measurement indication information is used to instruct the target UE to measure the CQI information in an intra-device interference occurrence period and an intra-device interference-free period in the interference sub-band respectively.

The offset determination submodule 502 is configured to determine the preset offset corresponding to the target UE according to a CQI measurement result obtained by the target UE.

Figure 32:
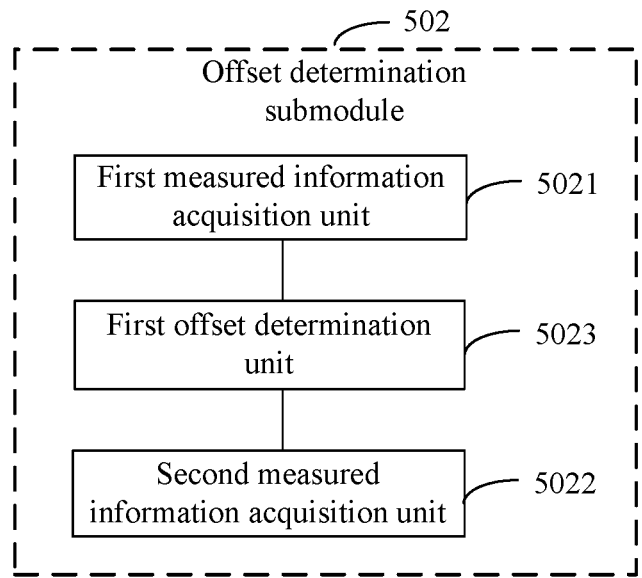
FIG. 32 is a block diagram of another base station according to some embodiments of the present disclosure.

FIG. 32 is a block diagram of another base station according to some embodiments. Based on the base station embodiment illustrated in FIG. 31, the offset determination submodule 502 may include a first measured information acquisition unit 5021, a second measured information acquisition unit 5022 and a first offset determination unit 5023.

The first measured information acquisition unit 5021 is configured to acquire first measured CQI information measured by the target UE in the intra-device interference occurrence period in the interference sub-band.

The second measured information acquisition unit 5022 is configured to acquire second measured CQI information measured by the target UE in the intra-device interference-free period in the interference sub-band.

The first offset determination unit 5023 is configured to determine the preset offset corresponding to the target UE according to a difference between the first measured CQI information and the second measured CQI information.

Figure 33:
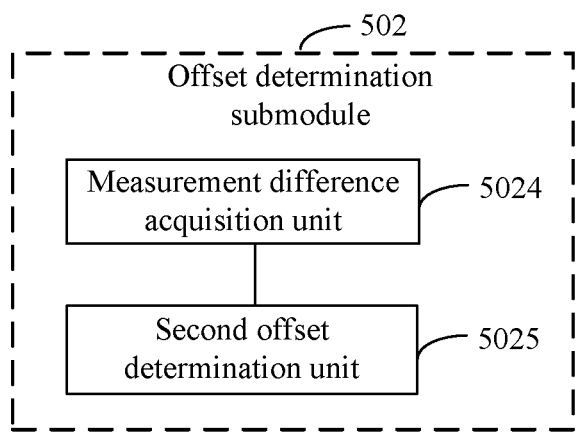
FIG. 33 is a block diagram of another base station according to some embodiments of the present disclosure.

FIG. 33 is a block diagram of another base station according to some embodiments. Based on the base station embodiment illustrated in FIG. 31, the offset determination submodule 502 may include a measurement difference acquisition unit 5024 and a second offset determination unit 5025.

The measurement difference acquisition unit 5024 is configured to acquire a CQI measurement result difference sent by the target UE. The CQI measurement result difference is a difference between measurement results obtained by the target UE in the intra-device interference occurrence period and the intra-device interference-free period in the interference sub-band.

The second offset determination unit 5025 is configured to determine the preset offset of the target UE according to the CQI measurement result difference.

The preset offset includes at least one of the following: an RSRP offset, an RSRQ offset, or a CQI level offset.

Figure 34:
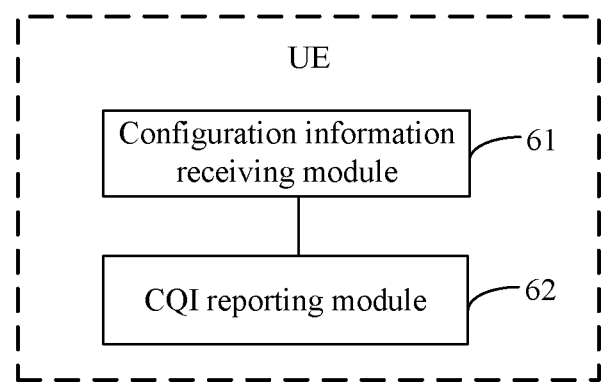
FIG. 34 is a block diagram of UE according to some embodiments of the present disclosure.

Correspondingly, the present disclosure also provides a UE. FIG. 34 is a block diagram of UE according to some embodiments. The UE may include a configuration information receiving module 61 and a CQI reporting module 62.

The configuration information receiving module 61 is configured to receive CQI feedback configuration information sent by a base station. The CQI feedback configuration information at least includes CQI feedback configuration information of an interference sub-band. The interference sub-band is a DL working frequency range involved in intra-device interference.

The CQI reporting module 62 is configured to report CQI information of different bandwidth granularities to the base station based on the CQI feedback configuration information.

Figure 35:
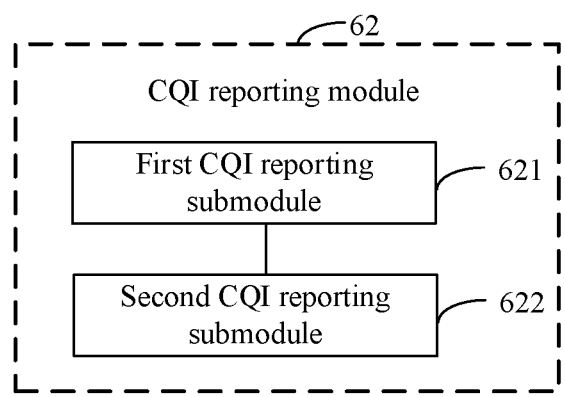
FIG. 35 is a block diagram of another UE according to some embodiments of the present disclosure.

FIG. 35 is a block diagram of another UE according to some embodiments. Based on the UE embodiment illustrated in FIG. 34, the CQI reporting module 62 may include a first CQI reporting submodule 621 and a second CQI reporting submodule 622.

The first CQI reporting submodule 621 is configured to report CQI information of the interference sub-band to the base station.

The second CQI reporting submodule 622 is configured to report CQI information of another one or more bandwidth granularities to the base station. The another one or more bandwidth granularities include a broadband, a sub-band specified by target UE, or a sub-band configured at the higher layer.

Figure 36:
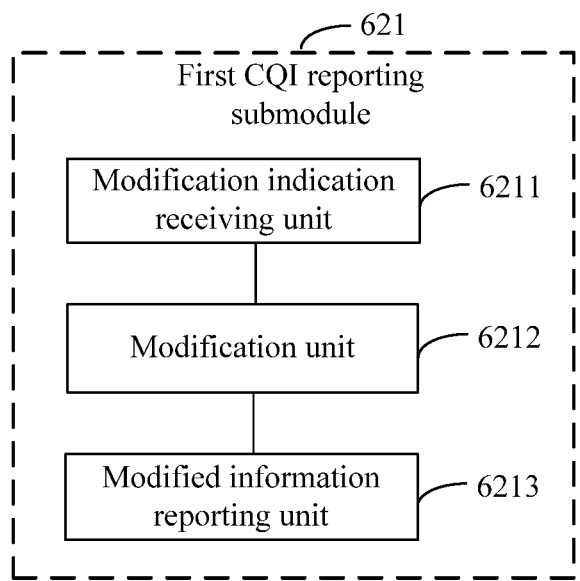
FIG. 36 is a block diagram of another UE according to some embodiments of the present disclosure.

FIG. 36 is a block diagram of another UE according to some embodiments. Based on the UE embodiment illustrated in FIG. 35, the first CQI reporting submodule 621 may include a modification indication receiving unit 6211, a modification unit 6212 and a modified information reporting unit 6213.

The modification indication receiving unit 6211 is configured to, before the CQI information of the interference sub-band is reported, receive CQI modification indication information transmitted by the base station.

The CQI modification indication information in some other embodiments of the present disclosure can further include the preset offset corresponding to the intra-device interference.

The modification unit 6212 is configured to modify, based on the CQI modification indication information, original CQI information of the interference sub-band by use of a preset offset to obtain modified CQI information.

The modified information reporting unit 6213 is configured to report the modified CQI information to the base station.

Figure 37:
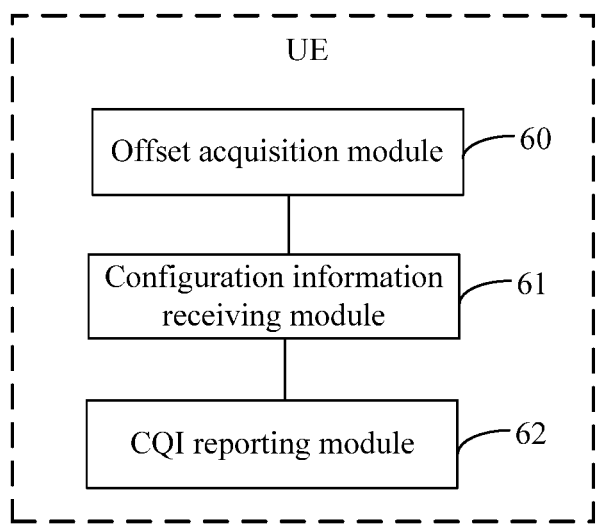
FIG. 37 is a block diagram of another UE according to some embodiments of the present disclosure.

FIG. 37 is a block diagram of another UE according to some embodiments. Based on the UE embodiment illustrated in FIG. 34, the UE may further include an offset acquisition module 60.

The offset acquisition module 60 is configured to acquire the preset offset for modifying the original CQI information of the interference sub-band.

Figure 38:
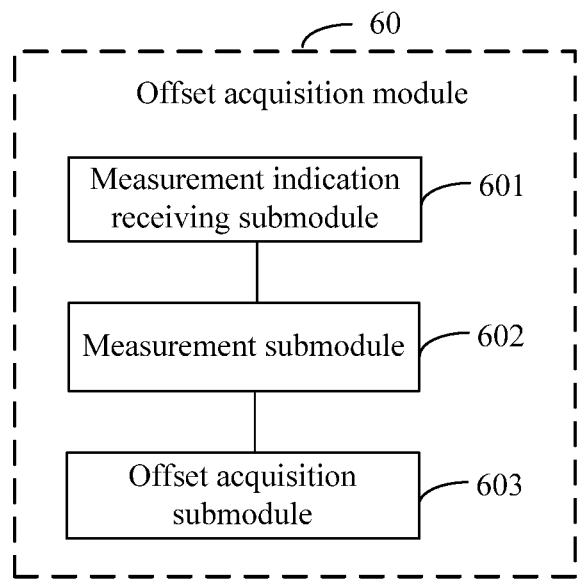
FIG. 38 is a block diagram of another UE according to some embodiments of the present disclosure.

FIG. 38 is a block diagram of another UE according to some embodiments. Based on the UE embodiment illustrated in FIG. 37, the offset acquisition module 60 may include a measurement indication receiving submodule 601, a measurement submodule 602 and an offset acquisition submodule 603.

The measurement indication receiving submodule 601 is configured to receive offset measurement indication information sent by the base station.

The measurement submodule 602 is configured to acquire, based on the offset measurement indication information, original measured CQI information in an intra-device interference occurrence period and intra-device interference-free period of the interference sub-band respectively.

The offset acquisition submodule 603 is configured to obtain the preset offset based on the original measured CQI information.

Figure 39:
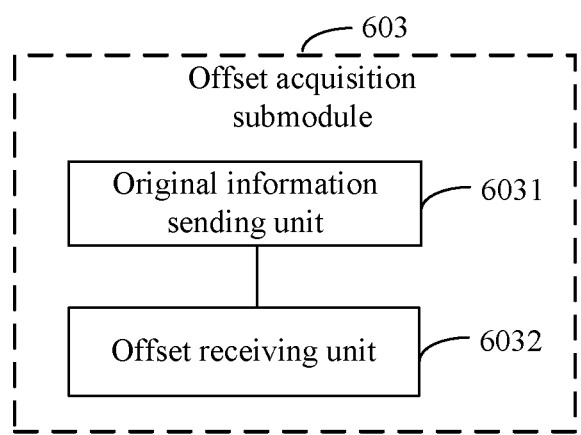
FIG. 39 is a block diagram of another UE according to some embodiments of the present disclosure.

FIG. 39 is a block diagram of another UE according to some embodiments. Based on the UE embodiment illustrated in FIG. 38, the offset acquisition submodule 603 may include an original information sending unit 6031 and an offset receiving unit 6032.

The original information sending unit 6031 is configured to send the original measured CQI information measured in the intra-device interference occurrence period and the intra-device interference-free period to the base station respectively to enable the base station to generate the preset offset based on the original measured CQI information.

The offset receiving unit 6032 is configured to receive the preset offset sent by the base station.

Figure 40:
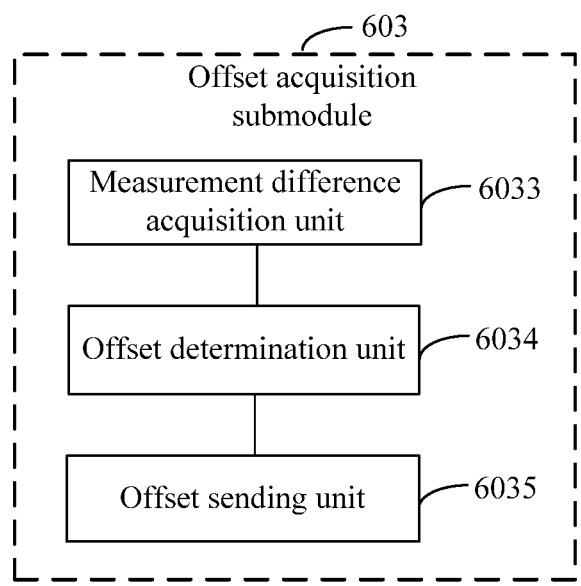
FIG. 40 is a block diagram of another UE according to some embodiments of the present disclosure.

FIG. 40 is a block diagram of another UE according to some embodiments. Based on the UE embodiment illustrated in FIG. 38, the offset acquisition submodule 603 may include a measurement difference acquisition unit 6033, an offset determination unit 6034 and an offset sending unit 6035.

The measurement difference acquisition unit 6033 is configured to determine a difference between first measured CQI information and second measured CQI information to obtain a measurement result difference. The first measured CQI information is the original CQI information measured in the intra-device interference occurrence period in the interference sub-band and the second measured CQI information is the original CQI information measured in the intra-device interference-free period in the interference sub-band.

The measurement result difference in the embodiments of the present disclosure may include at least one of:
an RSRP difference, an RSRQ difference, or a CQI level difference.

The offset determination unit 6034 is configured to determine the preset offset according to the measurement result difference.

The offset sending unit 6035 is configured to send the preset offset to the base station.

According to another aspect, corresponding to the CQI information determination method embodiments illustrated in FIG. 20 and the following figures, the present disclosure also provides some other embodiments of an application function realization device and a corresponding terminal.

Figure 41:
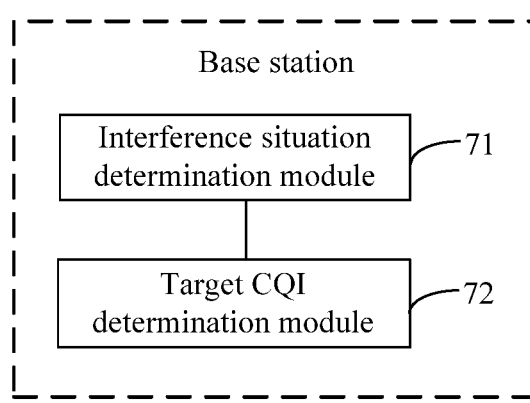
FIG. 41 is a block diagram of a base station according to some embodiments of the present disclosure.

FIG. 41 is a block diagram of a base station according to some embodiments. The base station may include an interference situation determination module 71 and a target CQI determination module 72.

The interference situation determination unit 71 is configured to determine whether intra-device interference occurrence situations of a target UE in a CQI measurement period and subsequent DL scheduling period of a target bandwidth granularity are the same or not.

The target bandwidth granularity may be a bandwidth granularity involved in a CQI feedback mode specified in a CQI feedback protocol in an LTE system.

For example, in a broadband CQI mode, the target bandwidth granularity is the whole system bandwidth. In a mode of sub-band selection by UE, the target bandwidth granularity may be the broadband and one or more sub-bands selected by the UE. In a mode of sub-band configuration at the higher layer, the target bandwidth granularity may be the broadband and all sub-bands configured at the higher layer. The target bandwidth granularity includes a frequency range involved in intra-device interference, namely the target bandwidth granularity may include all an interference sub-band or part of the interference sub-band. The interference sub-band is a frequency range that may be influenced by the intra-device interference in a DL working frequency range supported by the UE.

The target CQI determination module 72 is configured to, in response to that the intra-device interference occurrence situations are different, determine, based on a preset offset, a target CQI level for subsequent DL scheduling in the target bandwidth granularity.

Figure 42:
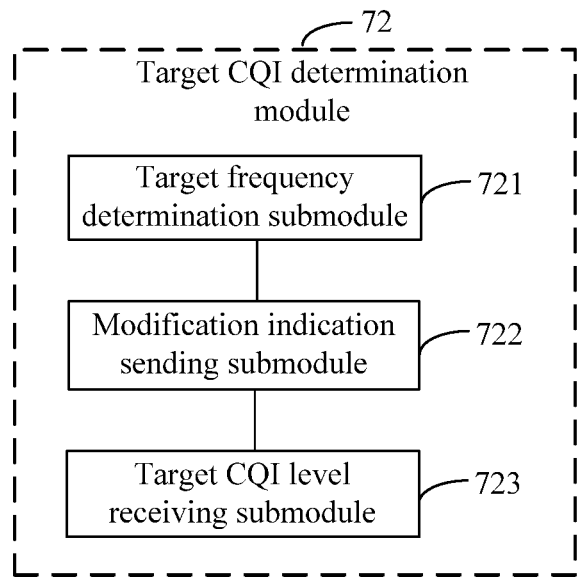
FIG. 42 is a block diagram of another base station according to some embodiments of the present disclosure.

FIG. 42 is a block diagram of another base station according to some embodiments. Based on the base station embodiment illustrated in FIG. 41, the target CQI determination module 72 may include a target frequency determination submodule 721, a modification indication sending submodule 722 and a target CQI level receiving submodule 723.

The target frequency determination submodule 721 is configured to, in response to that the intra-device interference occurrence situations are different, determine a target frequency range involved in intra-device interference in the target bandwidth granularity.

As illustrated in FIG. 23, if the target bandwidth granularity is a sub-band corresponding to a frequency range W3, a frequency range W31 in the figure is the target frequency range involved in the intra-device interference.

The modification indication sending submodule 722 is configured to send CQI modification indication information to the target UE. The CQI modification indication information includes the target frequency range.

Still in the above example, the base station, before receiving a CQI level, reported by the target UE, of the sub-band W3, may send the modification indication information to the target UE to indicate that the target UE is required to modify an original measured value, measured in a time-frequency resource (T1, W3), of a reference signal and indicate that only an original measured value, corresponding to the target frequency range W31, of a reference signal is required to be modified.

In some other embodiments of base station in some embodiments of the present disclosure, the CQI modification indication information may further include the preset offset for modifying influence of the intra-device interference. The preset offset is configured to modify original CQI information of the target frequency range.

The target CQI level receiving submodule 723 is configured to receive the target CQI level sent by the target UE. The target CQI level is a CQI level determined after the target UE modifies an original measured value of a reference signal in the target frequency range by use of the preset offset.

Figure 43:
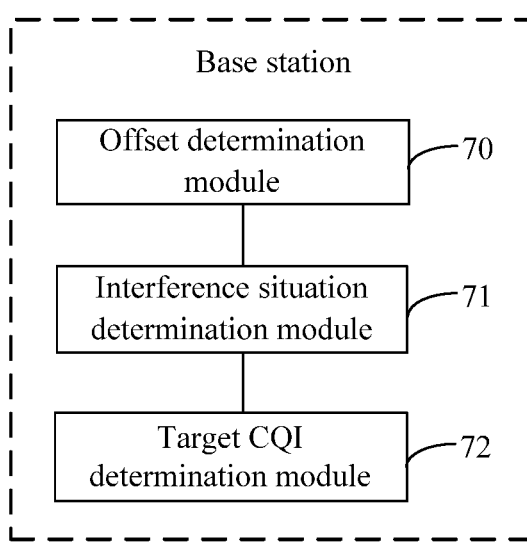
FIG. 43 is a block diagram of another base station according to some embodiments of the present disclosure.

FIG. 43 is a block diagram of another base station according to some embodiments. Based on the base station embodiment illustrated in FIG. 41, the base station may further include an offset determination module 70, an interference situation determination module 71 and a target CQI determination module 72.

The offset determination module 70 is configured to determine the preset offset corresponding to the target UE. The preset offset is an intra-device interference influence value of an interference sub-band. The interference sub-band is a DL frequency range involved in the intra-device interference.

Figure 44:
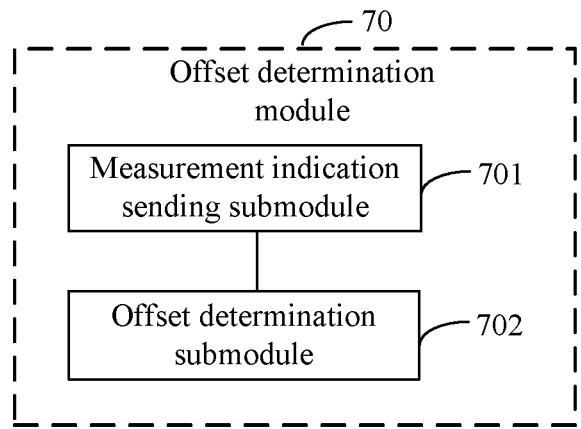
FIG. 44 is a block diagram of another base station according to some embodiments of the present disclosure.

FIG. 44 is a block diagram of another base station according to some embodiments. Based on the base station embodiment illustrated in FIG. 43, the offset determination module 70 may include a measurement indication sending submodule 701 and an offset determination submodule 702.

The measurement indication sending submodule 701 is configured to, when the target UE initially accesses a network, send offset measurement indication information to the target UE. The offset measurement indication information is configured to instruct the target UE to measure CQI information in an intra-device interference occurrence period and an intra-device interference-free period in the interference sub-band respectively.

The offset determination submodule 702 is configured to determine the preset offset corresponding to the target UE according to a CQI measurement result obtained by the target UE.

In the embodiments of the present disclosure, the preset offset may include at least one of the following:
an RSRP offset, an RSRQ offset, or a CQI level offset.

Figure 45:
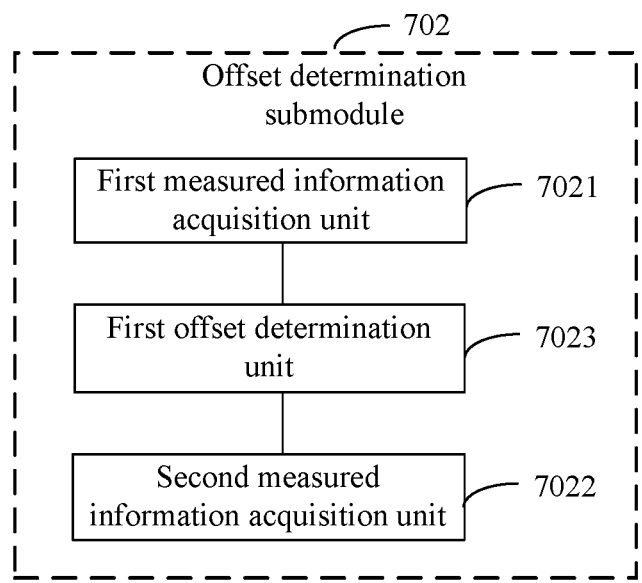
FIG. 45 is a block diagram of another base station according to some embodiments of the present disclosure.

FIG. 45 is a block diagram of another base station according to some embodiments. Based on the base station embodiment illustrated in FIG. 44, the offset determination submodule 702 may include a first measured information acquisition unit 7021, a second measured information acquisition unit 7022, and a first offset determination unit 7023.

The first measured information acquisition unit 7021 is configured to acquire first measured CQI information measured by the target UE in the intra-device interference occurrence period in the interference sub-band.

The second measured information acquisition unit 7022 is configured to acquire second measured CQI information measured by the target UE in the intra-device interference-free period in the interference sub-band.

The first offset determination unit 7023 is configured to determine the preset offset corresponding to the target UE according to a difference between the first measured CQI information and the second measured CQI information.

In some embodiments of the present disclosure, the base station embodiment illustrated in FIG. 45 is similar to the base station embodiment illustrated in FIG. 32.

Figure 46:
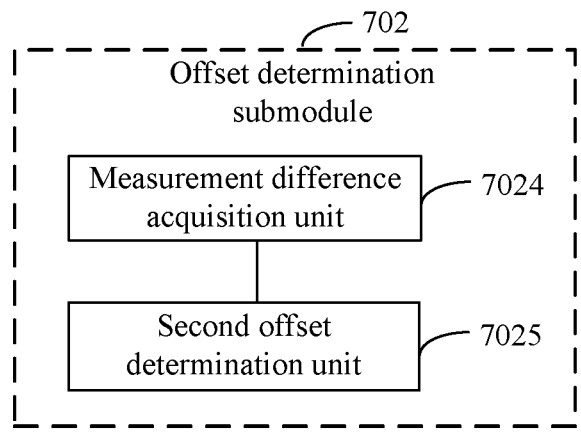
FIG. 46 is a block diagram of another base station according to some embodiments of the present disclosure.

FIG. 46 is a block diagram of another base station according to some embodiments. Based on the base station embodiment illustrated in FIG. 44, the offset determination submodule 702 may include a measurement difference acquisition unit 7024 and a second offset determination unit 7025.

The measurement difference acquisition unit 7024 is configured to acquire a CQI measurement result difference sent by the target UE. The CQI measurement result difference is a difference between measurement results obtained by the target UE in the intra-device interference occurrence period and the intra-device interference-free period in the interference sub-band.

The second offset determination unit 7025 is configured to determine the preset offset of the target UE according to the CQI measurement result difference.

In some embodiments of the present disclosure, the base station embodiment illustrated in FIG. 46 is similar to the base station embodiment illustrated in FIG. 33.

Corresponding to the another CQI information determination method embodiment applied to the UE in FIG. 22 and the following figures, the present disclosure also correspondingly provides another UE.

Figure 47:
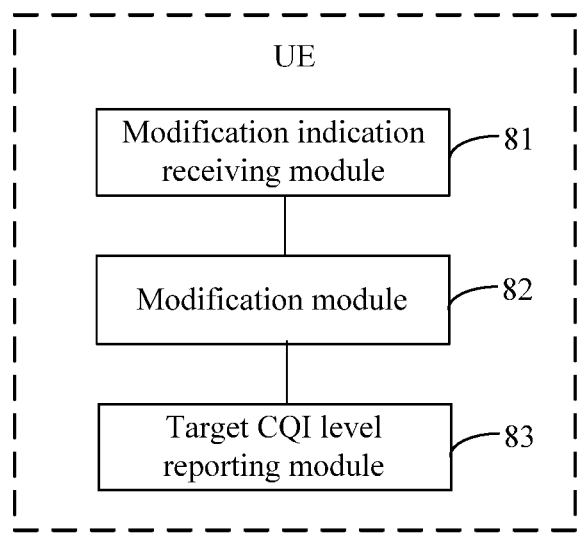
FIG. 47 is a block diagram of UE according to some embodiments of the present disclosure.

FIG. 47 is a block diagram of UE according to some embodiments. The UE may include a modification indication receiving module 81, a modification module 82 and a target CQI level reporting module 83.

The modification indication receiving module 81 is configured to receive CQI modification indication information sent by a base station.

The modification module 82 is configured to modify, based on the CQI modification indication information, measured CQI information of a target bandwidth granularity according to a preset offset to obtain a target CQI level.

A target CQI level reporting module 83 is configured to report the target CQI level to the base station.

In some embodiments of the present disclosure, the UE embodiment illustrated in FIG. 47 is similar to the UE embodiment illustrated in FIG. 36.

Figure 48:
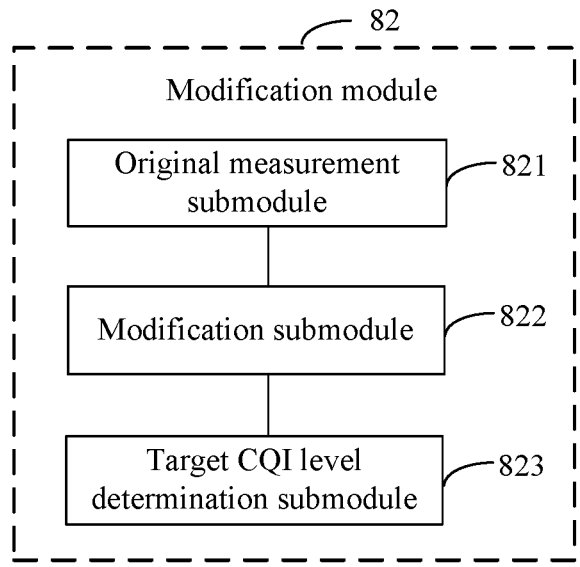
FIG. 48 is a block diagram of another UE according to some embodiments of the present disclosure.

In some other embodiments of the present disclosure, the CQI modification indication information received by the modification indication receiving module 81 may include a target frequency range involved in intra-device interference in the target bandwidth granularity. Correspondingly, FIG. 48 is a block diagram of another UE according to some embodiments. Based on the UE embodiment illustrated in FIG. 47, the modification module 82 may include an original measurement submodule 821, a modification submodule 822 and a target CQI level determination submodule 823.

The original measurement submodule 821 is configured to acquire an original measured value of a reference signal in the target frequency range.

The modification submodule 822 is configured to modify the original measured value of the reference signal according to a preset offset to obtain modified reference signal strength in the target frequency range.

The target CQI level determination submodule 823 is configured to determine a CQI level of the target bandwidth granularity according to the modified reference signal strength of the target frequency range.

Figure 49:
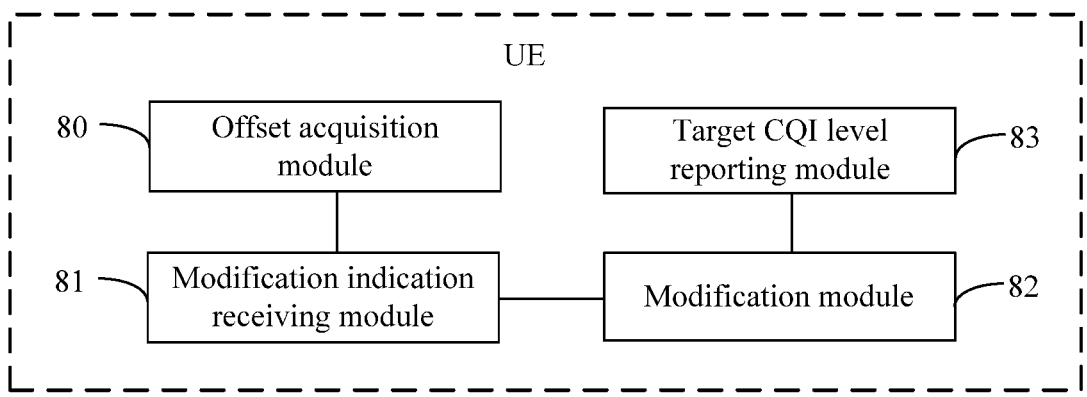
FIG. 49 is a block diagram of another UE according to some embodiments of the present disclosure.

FIG. 49 is a block diagram of another UE according to some embodiments. Based on the UE embodiment illustrated in FIG. 47, the UE may further include an offset acquisition module 80.

The offset acquisition module 80 is configured to acquire the preset offset for modifying influence of the intra-device interference.

Figure 50:
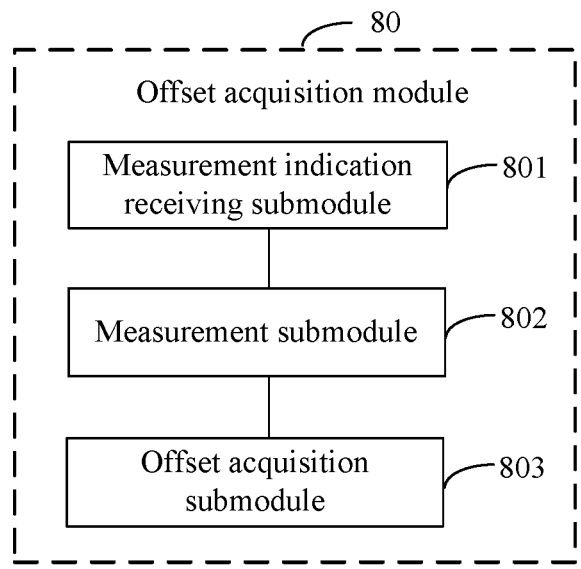
FIG. 50 is a block diagram of another UE according to some embodiments of the present disclosure.

FIG. 50 is a block diagram of another UE according to some embodiments. Based on the UE embodiment illustrated in FIG. 49, the offset acquisition module 80 may include a measurement indication receiving submodule 801, a measurement submodule 802 and an offset acquisition submodule 803.

The measurement indication receiving submodule 801 is configured to receive offset measurement indication information sent by the base station.

The measurement submodule 802 is configured to acquire, based on the offset measurement indication information, original measured CQI information in an intra-device interference occurrence period and intra-device interference-free period of an interference sub-band respectively. The interference sub-band is a DL frequency range involved in the intra-device interference.

The offset acquisition submodule 803 is configured to obtain the preset offset according to the original measured CQI information.

Figure 51:
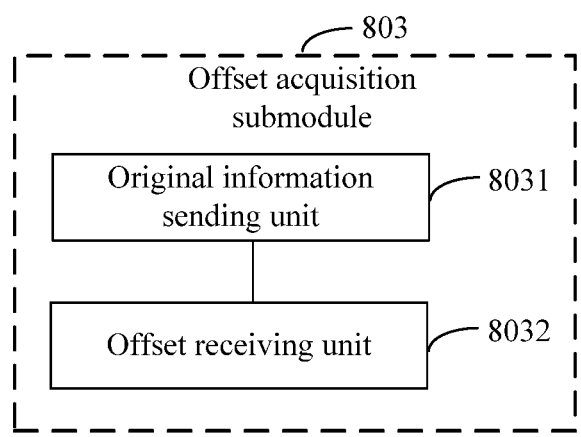
FIG. 51 is a block diagram of another UE according to some embodiments of the present disclosure.

FIG. 51 is a block diagram of another UE according to some embodiments. Based on the UE embodiment illustrated in FIG. 50, the offset acquisition submodule 803 may include an original information sending unit 8031 and an offset receiving unit 8032.

The original information sending unit 8031 is configured to send the original measured CQI information measured in the intra-device interference occurrence period and intra-device interference-free period of the interference sub-band to the base station respectively to enable the base station to generate the preset offset according to the original measured CQI information.

The offset receiving unit 8032 is configured to receive the preset offset sent by the base station.

In some embodiments of the present disclosure, the UE embodiment illustrated in FIG. 51 is similar to the UE embodiment illustrated in FIG. 39.

Figure 52:
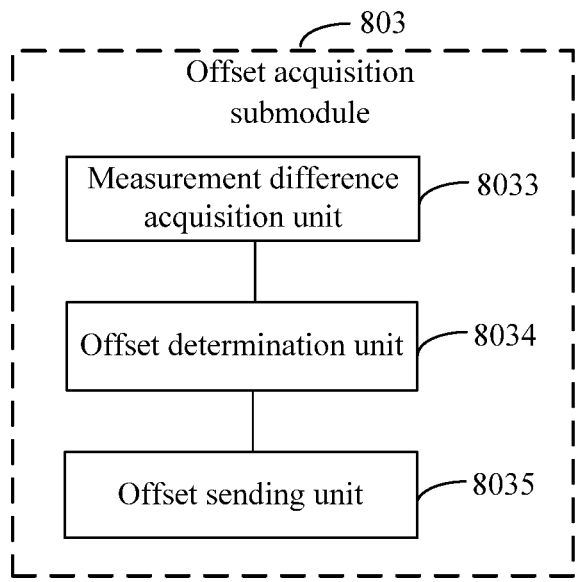
FIG. 52 is a block diagram of another UE according to some embodiments of the present disclosure.

FIG. 52 is a block diagram of another UE according to some embodiments. Based on the UE embodiment illustrated in FIG. 50, the offset acquisition submodule 803 may include a measurement difference acquisition unit 8033, an offset determination unit 8034 and an offset sending unit 8035.

The measurement difference acquisition unit 8033 is configured to determine a difference between first measured CQI information and second measured CQI information to obtain a measurement result difference. The first measured CQI information is the original CQI information measured in the intra-device interference occurrence period in the interference sub-band and the second measured CQI information is the original CQI information measured in the intra-device interference-free period in the interference sub-band.

The measurement result difference may include at least one of the following:

an RSRP difference, an RSRQ difference, or a CQI level difference.

The offset determination unit 8034 is configured to determine the preset offset according to the measurement result difference.

The offset sending unit 8035 is configured to send the preset offset to the base station.

In some embodiments of the present disclosure, the UE embodiment illustrated in FIG. 52 is similar to the UE embodiment illustrated in FIG. 40.

The device embodiments substantially correspond to the method embodiments, and thus related parts refer to descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

Correspondingly, the present disclosure provides two base stations.

Herein, the first base station includes:
a processor; and
a memory configured to store instructions executable for the processor,
where the processor is configured to:
determine CQI feedback configuration information of target UE, where the CQI feedback configuration information at least includes CQI feedback configuration information of an interference sub-band, and the interference sub-band is a DL frequency range involved in intra-device interference;
send the CQI feedback configuration information to the target UE; and
determine target CQI information for subsequent DL scheduling based on CQI information, reported by the target UE based on the CQI feedback configuration information, of different bandwidth granularities.

The second base station includes:
a processor; and
a memory configured to store instructions executable for the processor,
where the processor is configured to:
determine whether intra-device interference occurrence situations of target UE in a CQI measurement period and subsequent DL scheduling period of a target bandwidth granularity are the same or not; and
in response to that the intra-device interference occurrence situations are different, determine, based on a preset offset, a target CQI level for subsequent DL scheduling in the target bandwidth granularity.

According to another aspect, the present disclosure provides two UEs.

Herein, the first UE includes:
a processor; and
a memory configured to store instructions executable for the processor, where the processor is configured to:
receive CQI feedback configuration information sent by a base station, where the CQI feedback configuration information at least includes CQI feedback configuration information of an interference sub-band and the interference sub-band is a DL working frequency range involved in intra-device interference; and
report CQI information of different bandwidth granularities to the base station according to the CQI feedback configuration information.

The second UE includes:
a processor; and
a memory configured to store instructions executable for the processor,
Where the processor is configured to:
receive CQI modification indication information sent by a base station;
modify, based on the CQI modification indication, measured CQI information of a target bandwidth granularity according to a preset offset to obtain a target CQI level; and
report the target CQI level to the base station.

Figure 53:
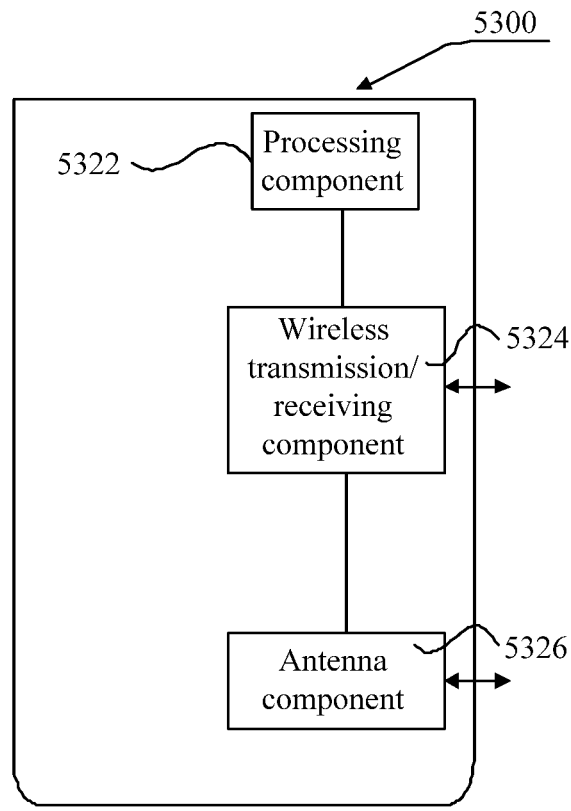
FIG. 53 is a structure diagram of a base station according to some embodiments of the present disclosure.

As illustrated in FIG. 53, FIG. 53 is a structure diagram of a base station 5300 according to some embodiments. Referring to FIG. 53, the base station 5300 includes a processing component 5322, a wireless transmission/receiving component 5324, an antenna component 5326 and a wireless interface-specific signal processing part. The processing component 5322 may further include one or more processors. One processor in the processing component 5322 may be configured to:

determine CQI feedback configuration information of target UE, where the CQI feedback configuration information at least includes CQI feedback configuration information of an interference sub-band and the interference sub-band is a DL frequency range involved in intra-device interference;
send the CQI feedback configuration information to the target UE; and
determine target CQI information for subsequent DL scheduling based on CQI information, reported by the target UE based on the CQI feedback configuration information, of different bandwidth granularities.

Or, one processor in the processing component 5322 may be configured to:
determine whether intra-device interference occurrence situations of target UE in a CQI measurement period and subsequent DL scheduling period of a target bandwidth granularity are the same or not; and
in response to that the intra-device interference occurrence situations are different, determine, based on a preset offset, a target CQI level for subsequent DL scheduling in the target bandwidth granularity.

In some embodiments, there is also provided a non-transitory computer-readable storage medium including instructions, in which computer instructions are stored, and the computer instructions may be executed by the processing component 5322 of the base station 5300 to implement the CQI information determination method illustrated in any one of FIGS. 2-12 or the CQI information determination method illustrated in any one of FIG. 20 and FIG. 21. For example, the non-transitory computer-readable storage medium may be a read-only memory (ROM), a random access memory (RAM), a compact disc read-only memory (CD-ROM), a magnetic tape, a floppy disc, an optical data storage device and the like.

Figure 54:
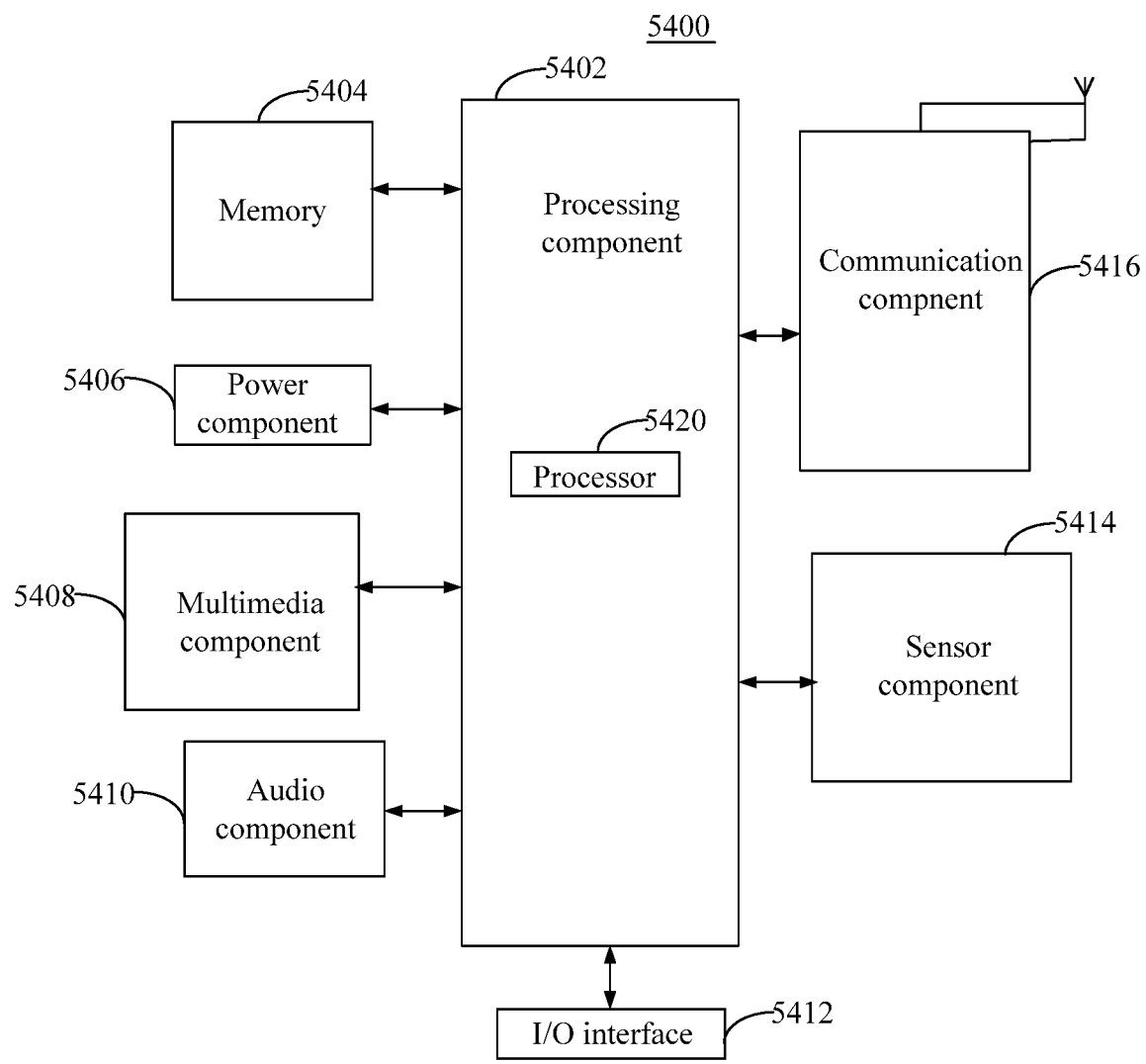
FIG. 54 is a structure diagram of UE according to some embodiments of the present disclosure.

FIG. 54 is a structure diagram of UE 5400 according to some embodiments. For example, the UE 5400 may be a terminal, and may specifically be a mobile phone, a computer, a digital broadcast terminal, a messaging device, a gaming console, a tablet, a medical device, exercise equipment, a personal digital assistant and a wearable device such as a smart watch, smart glasses, a smart band and smart running shoes.

Referring to FIG. 54, the UE 5400 may include one or more of the following components: a processing component 5402, a memory 5404, a power component 5406, a multimedia component 5408, an audio component 5410, an input/output (I/O) interface 5412, a sensor component 5414, and a communication component 5416.

The processing component 5402 typically controls overall operations of the UE 5400, such as the operations associated with display, telephone calls, data communications, camera operations, and recording operations. The processing component 5402 may include one or more processors 5420 to execute instructions to perform all or part of the operations in the abovementioned method. Moreover, the processing component 5402 may include one or more modules which facilitate interaction between the processing component 5402 and the other components. For instance, the processing component 5402 may include a multimedia module to facilitate interaction between the multimedia component 5408 and the processing component 5402.

The memory 5404 is configured to store various types of data to support the operation of the UE 5400. Examples of such data include instructions for any application programs or methods operated on the UE 5400, contact data, phonebook data, messages, pictures, video, etc. The memory 5404 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a ROM, a magnetic memory, a flash memory, and a magnetic or optical disk.

The power component 5406 provides power for various components of the UE 5400. The power component 5406 may include a power management system, one or more power supplies, and other components associated with generation, management and distribution of power for the UE 5400.

The multimedia component 5408 includes a screen providing an output interface between the UE 5400 and a user. In some embodiments, the screen may include a liquid crystal display (LCD) and a touch panel (TP). In some embodiments, the screen may include an organic light-emitting diode (OLED) display or other types of displays.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 5408 includes a front camera and/or a rear camera. The front camera and/or the rear camera may receive external multimedia data when the device 5400 is in an operation mode, such as a photographing mode or a video mode. Each of the front camera and the rear camera may be a fixed optical lens system or have focusing and optical zooming capabilities.

The audio component 5410 is configured to output and/or input an audio signal. For example, the audio component 5410 includes a microphone (MIC), and the MIC is configured to receive an external audio signal when the UE 5400 is in the operation mode, such as a call mode, a recording mode and a voice recognition mode. The received audio signal may further be stored in the memory 5404 or sent through the communication component 5416. In some embodiments, the audio component 5410 further includes a speaker configured to output the audio signal.

The I/O interface 5412 provides an interface between the processing component 5402 and a peripheral interface module, and the peripheral interface module may be a keyboard, a click wheel, a button and the like. The button may include, but not limited to: a home button, a volume button, a starting button and a locking button.

The sensor component 5414 includes one or more sensors configured to provide status assessment in various aspects for the UE 5400. For instance, the sensor component 5414 may detect an on/off status of the UE 5400 and relative positioning of components, such as a display and small keyboard of the UE 5400, and the sensor component 5414 may further detect a change in a position of the UE 5400 or a component of the UE 5400, presence or absence of contact between the user and the device 5400, orientation or acceleration/deceleration of the UE 5400 and a change in temperature of the UE 5400. The sensor component 5414 may include a proximity sensor configured to detect presence of an object nearby without any physical contact. The sensor component 5414 may also include a light sensor, such as a complementary metal oxide semiconductor (CMOS) or charge coupled device (CCD) image sensor, configured for use in an imaging application. In some embodiments, the sensor component 5414 may also include an acceleration sensor, a gyroscope sensor, a magnetic sensor, a pressure sensor or a temperature sensor.

The communication component 5416 is configured to facilitate wired or wireless communication between the UE 5400 and another device. The UE 5400 may access a communication-standard-based wireless network, such as a wireless fidelity (Wi-Fi) network, a 2nd-Generation (2G), 3rd-Generation (3G), 4G, or 5G network or a combination thereof. In some embodiments, the communication component 5416 receives a broadcast signal or broadcast associated information from an external broadcast management system through a broadcast channel. In some embodiments, the communication component 5416 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and another technology.

In some embodiments, the UE 5400 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In some embodiments, there is also provided a non-transitory computer-readable storage medium including instructions, such as the memory 5404 including instructions, and the instructions may be executed by the processor 5420 of the UE 5400 to implement the CQI information determination method illustrated in any one of FIG. 13 to FIG. 19 or the CQI information determination method illustrate in FIG. 22. For example, the non-transitory computer-readable storage medium may be a ROM, a RAM, a CD-ROM, a magnetic tape, a floppy disc, an optical data storage device and the like.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A method for determining channel quality indication (CQI) information, implemented by a base station, the method comprising:
   determining CQI feedback configuration information of a target user equipment (UE), wherein the CQI feedback configuration information at least comprises CQI feedback configuration information of an interference sub-band, and the interference sub-band is a downlink (DL) frequency range involved in intra-device interference;
   sending the CQI feedback configuration information to the target UE; and
   determining target CQI information for subsequent DL scheduling based on CQI information, reported by the target UE based on the CQI feedback configuration information, of different bandwidth granularities, comprising:
      determining target CQI information for subsequent DL scheduling in the interference sub-band based on CQI information, determined by the target UE, of the interference sub-band; and
      determining target CQI information for subsequent DL scheduling in the interference-free sub-band based on CQI information, determined by the target UE, of another one or more bandwidth granularities,
   wherein the interference-free sub-band is a DL frequency range not involved in the intra-device interference, and the another one or more bandwidth granularities comprise a broadband, a sub-band specified by the target UE, or a sub-band configured at a higher layer.

2. A method for determining channel quality indication (CQI) information, implemented by a user equipment (UE), the method comprising:
   receiving CQI feedback configuration information from a base station, wherein the CQI feedback configuration information at least comprises CQI feedback configuration information of an interference sub-band, and the interference sub-band is a downlink (DL) working frequency range involved in intra-device interference; and
   reporting CQI information of different bandwidth granularities to the base station based on the CQI feedback configuration information, comprising:
      receiving CQI modification indication information from the base station;
      modifying, based on the CQI modification indication information, original CQI information of the interference sub-band by use of a preset offset to obtain modified CQI information;
      reporting the modified CQI information of the interference sub-band to the base station; and
      reporting CQI information of another one or more bandwidth granularities to the base station, wherein the another one or more bandwidth granularities comprise a broadband, a sub-band specified by target UE, or a sub-band configured at a higher layer.

3. A base station, comprising:
   a transceiver;
   a processor; and
   a memory configured to store instructions executable for the processor,
   wherein the processor is configured to:
   determine channel quality indication (CQI) feedback configuration information of a target user equipment (UE), wherein the CQI feedback configuration information at least comprises CQI feedback configuration information of an interference sub-band, and the interference sub-band is a downlink (DL) frequency range involved in intra-device interference;
   send, through the transceiver, the CQI feedback configuration information to the target UE; and
   determine target CQI information for subsequent DL scheduling based on CQI information, reported by the target UE based on the CQI feedback configuration information, of different bandwidth granularities;
   wherein the processor is further configured to:
      determine target CQI information for subsequent DL scheduling in the interference sub-band based on CQI information, determined by the target UE, of the interference sub-band; and
      determine target CQI information for subsequent DL scheduling in the interference-free sub-band based on CQI information, determined by the target UE, of another one or more bandwidth granularities,
   wherein the interference-free sub-band is a DL frequency range not involved in the intra-device interference, and the another one or more bandwidth granularities comprise a broadband, a sub-band specified by the target UE, or a sub-band configured at a higher layer.

4. The base station of claim 3, wherein the processor is further configured to:
   determine, based on radio frequency supporting capability information of the target UE, the interference sub-band involved in the intra-device interference and an interference-free sub-band not involved in the intra-device interference; and
   determine the CQI feedback configuration information of the target UE based on the interference sub-band and the interference-free sub-band.

5. The base station of claim 3, wherein the processor is further configured to:
   determine whether intra-device interference occurrence situations of the target UE in a CQI measurement period and subsequent DL scheduling period of the interference sub-band are the same;
   in response to determining that the intra-device interference occurrence situations are different, acquire modified CQI information; and
   determine, based on the modified CQI information, the target CQI information for subsequent DL scheduling in the interference sub-band.

6. The base station of claim 5, wherein the processor is further configured to:
   before the subsequent DL scheduling is executed, send, through the transceiver, CQI modification indication information to the target UE to instruct the target UE to modify determined original CQI information by use of a preset offset; and
   receive, through the transceiver, the modified CQI information reported by the target UE.

7. The base station of claim 6, wherein the CQI modification indication information comprises the preset offset for modifying the original CQI information.

8. The base station of claim 5, wherein the processor is further configured to:
   receive, through the transceiver, original CQI information obtained by the target UE in the CQI measurement period of the interference sub-band; and
   modify the original CQI information by use of a preset offset to obtain the modified CQI information.

9. The base station of claim 3, wherein the processor is further configured to:
   determine a preset offset corresponding to the target UE, wherein the preset offset is an intra-device interference influence value of the interference sub-band.

10. The base station of claim 9, wherein the processor is further configured to:
   when the target UE initially accesses a network, send, through the transceiver, offset measurement indication information to the target UE, wherein the offset measurement indication information is to instruct the target UE to measure CQI information in an intra-device interference occurrence period and an intra-device interference-free period in the interference sub-band respectively; and
   determine the preset offset corresponding to the target UE according to a CQI measurement result obtained by the target UE.

11. The base station of claim 10, wherein the processor is further configured to:
   acquire first measured CQI information measured by the target UE in the intra-device interference occurrence period in the interference sub-band;
   acquire second measured CQI information measured by the target UE in the intra-device interference-free period in the interference sub-band; and
   determine the preset offset corresponding to the target UE according to a difference between the first measured CQI information and the second measured CQI information; or,
   acquire a CQI measurement result difference from the target UE, wherein the CQI measurement result difference is a difference between measurement results obtained by the target UE in the intra-device interference occurrence period and the intra-device interference-free period in the interference sub-band; and
   determine the preset offset corresponding to the target UE according to the CQI measurement result difference.

12. The base station of claim 10, wherein the preset offset comprises at least one of:
   a reference signal received power (RSRP) offset, a received signal received quality (RSRQ) offset, or a CQI level offset.

13. User Equipment (UE), comprising:
   a transceiver;
   a processor; and
   a memory configured to store instructions executable for the processor,
   wherein the processor is configured to:
   receive, through the transceiver, channel quality indication (CQI) feedback configuration information from a base station, wherein the CQI feedback configuration information at least comprises CQI feedback configuration information of an interference sub-band, and the interference sub-band is a downlink (DL) working frequency range involved in intra-device interference; and
   report, through the transceiver, CQI information of different bandwidth granularities to the base station based on the CQI feedback configuration information;
   wherein the processor is further configured to:
      receive, through the transceiver, CQI modification indication information from the base station;
      modify, based on the CQI modification indication information, original CQI information of the interference sub-band by use of a preset offset to obtain modified CQI information;
      report, through the transceiver, the modified CQI information of the interference sub-band to the base station; and
      report, through the transceiver, CQI information of another one or more bandwidth granularities to the base station, wherein the another one or more bandwidth granularities comprise a broadband, a sub-band specified by target UE, or a sub-band configured at a higher layer.

14. The UE of claim 13, wherein the CQI modification indication information comprises the preset offset corresponding to the intra-device interference.

15. The UE of claim 13, wherein the processor is further configured to:
   acquire the preset offset for modifying the original CQI information of the interference sub-band;
   wherein the processor is further configured to:
   receive, through the transceiver, offset measurement indication information from the base station;
   acquire, based on the offset measurement indication information, original measured CQI information in an intra-device interference occurrence period and intra-device interference-free period of the interference sub-band respectively; and obtain the preset offset based on the original measured CQI information.

16. The UE of claim 15, wherein the processor is further configured to:

send, through the transceiver, the original measured CQI information measured in the intra-device interference occurrence period and the intra-device interference-free period to the base station respectively such that the base station generates the preset offset based on the original measured CQI information; and receive, through the transceiver, the preset offset from the base station;

or, determine a difference between first measured CQI information and second measured CQI information to obtain a measurement result difference, wherein the first measured CQI information is the original CQI information measured in the intra-device interference occurrence period in the interference sub-band and the second measured CQI information is the original CQI information measured in the intra-device interference-free period in the interference sub-band;

determine the preset offset based on the measurement result difference; and send, through the transceiver, the preset offset to the base station.

17. A communication system implementing the method of claim 1, comprising the base station, wherein the base station is a 5th-generation (5G) new radio (NR) network base station, and is configured to instruct the target UE to report the CQI information of the interference sub-band through an uplink (UL), determine target CQI information for subsequent DL scheduling in the interference sub-band based on the CQI information of the interference sub-band; and determine target CQI information for subsequent DL scheduling in the interference-free sub-band based on CQI information of another one or more bandwidth granularities, wherein the interference-free sub-band is a DL frequency range not involved in the intra-device interference, and the another one or more bandwidth granularities comprise a broadband, a sub-band specified by the target UE, or a sub-band configured at a higher layer, to thereby accurately determine a DL channel condition of the interference sub-band during subsequent DL scheduling based on the target CQI information and then configure a proper modulation and coding scheme for the target UE according to the channel condition, to thereby improve accuracy of the modulation and coding scheme for subsequent DL scheduling of the target UE, accuracy of DL transmission rate for DL information to be transmitted to the target UE, and overall system performance.

* * * * *